United States Patent
Hagiwara

(10) Patent No.: US 11,803,042 B2
(45) Date of Patent: Oct. 31, 2023

(54) ZOOM LENS AND IMAGE PICKUP APPARATUS

(71) Applicant: CANON KABUSHIKI KAISHA, Tokyo (JP)

(72) Inventor: Yasuaki Hagiwara, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 318 days.

(21) Appl. No.: 16/915,088

(22) Filed: Jun. 29, 2020

(65) Prior Publication Data

US 2021/0003831 A1 Jan. 7, 2021

(30) Foreign Application Priority Data

Jul. 3, 2019 (JP) ................................ 2019-124849

(51) Int. Cl.
*G02B 15/14* (2006.01)
*G02B 13/18* (2006.01)
(Continued)

(52) U.S. Cl.
CPC ..... *G02B 15/144105* (2019.08); *G02B 13/18* (2013.01); *G02B 15/144113* (2019.08);
(Continued)

(58) Field of Classification Search
CPC .... G02B 15/144105; G02B 15/144113; G02B 15/145105; G02B 15/145113;
(Continued)

(56) References Cited

U.S. PATENT DOCUMENTS 8,520,318 B2 8/2013 Hosoi
9,880,376 B2 1/2018 Miyazawa
(Continued)

FOREIGN PATENT DOCUMENTS

CN 102243363 A 11/2011
CN 105652423 A 6/2016
(Continued)

OTHER PUBLICATIONS

English language translation of Hayashi et. al. JP 2015-018124 A, 2015 (Year: 2015).*
(Continued)

*Primary Examiner* — Marin Pichler
(74) *Attorney, Agent, or Firm* — ROSSI, KIMMS & McDOWELL LLP

(57) ABSTRACT

A zoom lens consists of, in order from an object side to an image side, a first lens unit having a positive refractive power, a second lens unit having a negative refractive power, a third lens unit having a positive refractive power, and a rear unit that includes a plurality of lens units. All lens units move during zooming, and a distance between adjacent lens units changes. The third lens unit includes, in order from the object side to the image side, a first subunit having a positive refractive power, a second subunit having a positive refractive power, and a third subunit having a positive refractive power. The second subunit includes a negative lens and a positive lens. The second subunit moves in a direction having a component orthogonal to an optical axis during an image stabilization. A predetermined condition is satisfied.

13 Claims, 15 Drawing Sheets

(51) Int. Cl.
*G02B 15/20* (2006.01)
*G03B 5/00* (2021.01)
*G02B 27/64* (2006.01)

(52) U.S. Cl.
CPC ............ *G02B 15/20* (2013.01); *G02B 27/646* (2013.01); *G03B 5/00* (2013.01); *G03B 2205/0015* (2013.01); *G03B 2205/0046* (2013.01)

(58) Field of Classification Search
CPC ........ G02B 15/145129; G02B 15/1461; G02B 15/16; G02B 13/18; G02B 15/20; G02B 27/646; G03B 5/00; G03B 5/04; G03B 2205/0015; G03B 2205/0046
USPC .................................................. 359/687, 686
See application file for complete search history.

(56) References Cited

U.S. PATENT DOCUMENTS

| | | | |
|---|---|---|---|
| 10,754,130 | B2 | 8/2020 | Ishikawa |
| 2010/0289926 | A1 | 11/2010 | Tanaka |
| 2011/0273780 | A1* | 11/2011 | Hosoi .................... G02B 13/06 359/683 |
| 2014/0333821 | A1* | 11/2014 | Hagiwara ............ G02B 15/173 359/557 |
| 2014/0368925 | A1 | 12/2014 | Kawamura |
| 2017/0293120 | A1* | 10/2017 | Tashiro .......... G02B 15/143503 |
| 2018/0284407 | A1* | 10/2018 | Iwasawa ............ G02B 27/0025 |

FOREIGN PATENT DOCUMENTS

| | | |
|---|---|---|
| CN | 108604003 A | 9/2018 |
| JP | 2010266505 A | 11/2010 |
| JP | 2013182259 A | 9/2013 |
| JP | 2014228734 A | 12/2014 |
| JP | 2014228812 A | 12/2014 |
| JP | 2015001538 A | 1/2015 |
| JP | 2015018124 A | 1/2015 |
| JP | 2015062082 A | 4/2015 |
| JP | 2015102588 A | 6/2015 |
| JP | 2017129668 A | 7/2017 |
| JP | 2017156428 A | 9/2017 |
| JP | 2017191159 A | 10/2017 |
| JP | 2018169564 A | 11/2018 |
| JP | 2018180203 A | 11/2018 |
| JP | 2019091027 A | 6/2019 |

OTHER PUBLICATIONS

Office Action issued in Chinese Appln. No. 202010628030.2 dated Dec. 31, 2021. English translation provided.
Office Action issued in Japanese Appln. No. 2019-124849 dated Jan. 31, 2023. English translation provided.

* cited by examiner

ZOOM LENS AND IMAGE PICKUP APPARATUS

BACKGROUND OF THE INVENTION

Field of the Invention

The present invention relates to a zoom lens and an image pickup apparatus having the same.

Description of the Related Art

High-performance and compact zoom lenses with a high zoom ratio and an (image stabilization) function that provides an optical image stabilization during image pickup have recently been required for image pickup optical systems used for an image pickup apparatus such as a digital still cameras using solid-state image sensors, video cameras, and film-based cameras using silver salt films.

Zoom lenses that are generally known as high-performance optical systems having a high zoom ratio include, in order from an object side, a first lens unit having a positive refractive power, a second lens unit having a negative refractive power, a third lens unit having a positive refractive power, and a plurality of subsequent lens units. Among them, an optical system is generally known that provides an image stabilization by moving the entire any one of lens units or the subunit in a direction substantially orthogonal to an optical axis.

For example, Japanese Patent Laid-Open Nos. (JPs) 2015-62082 and 2010-266505 disclose zoom lenses that include, in order from an object side, a first lens unit having a positive refractive power, a second lens unit having a negative refractive power, a third lens unit having a positive refractive power, and a plurality of subsequent lens units, and provide an image stabilization by moving part of the third lens unit in a direction substantially orthogonal to the optical axis.

The zoom lenses used for the image pickup apparatuses are required to have a high zoom ratio (high magnification variation ratio), a high optical performance, and an image stabilization function during image pickup. A sufficiently compact configuration is also required for the practical size.

However, the zoom lenses described in JPs 2015-62082 and 2010-266505 do not always meet these requirements.

SUMMARY OF THE INVENTION

The present invention provides a zoom lens and an image pickup apparatus having the same, each of which has a compact configuration, a high zoom ratio, a good optical performance over an entire zoom range from a wide-angle end to a telephoto end, and an image stabilization function.

A zoom lens according to one aspect of the present invention consisting of, in order from an object side to an image side, a first lens unit having a positive refractive power, a second lens unit having a negative refractive power, a third lens unit having a positive refractive power, and a rear unit that includes a plurality of lens units. All lens units move during zooming, and a distance between adjacent lens units changes. The third lens unit includes, in order from the object side to the image side, a first subunit having a positive refractive power, a second subunit having a negative refractive power, and a third subunit having a positive refractive power. The second subunit includes a negative lens and a positive lens. The second subunit moves in a direction having a component orthogonal to an optical axis during an image stabilization. The following conditional expression is satisfied:

$$0.80 < f3/|f2| < 1.29$$

where f2 is a focal length of the second lens unit, and f3 is a focal length of the third lens unit.

An image pickup apparatus having the above zoom lens also constitutes another aspect of the present invention.

Further features of the present invention will become apparent from the following description of exemplary embodiments with reference to the attached drawings.

DESCRIPTION OF THE EMBODIMENTS

Figure 1:
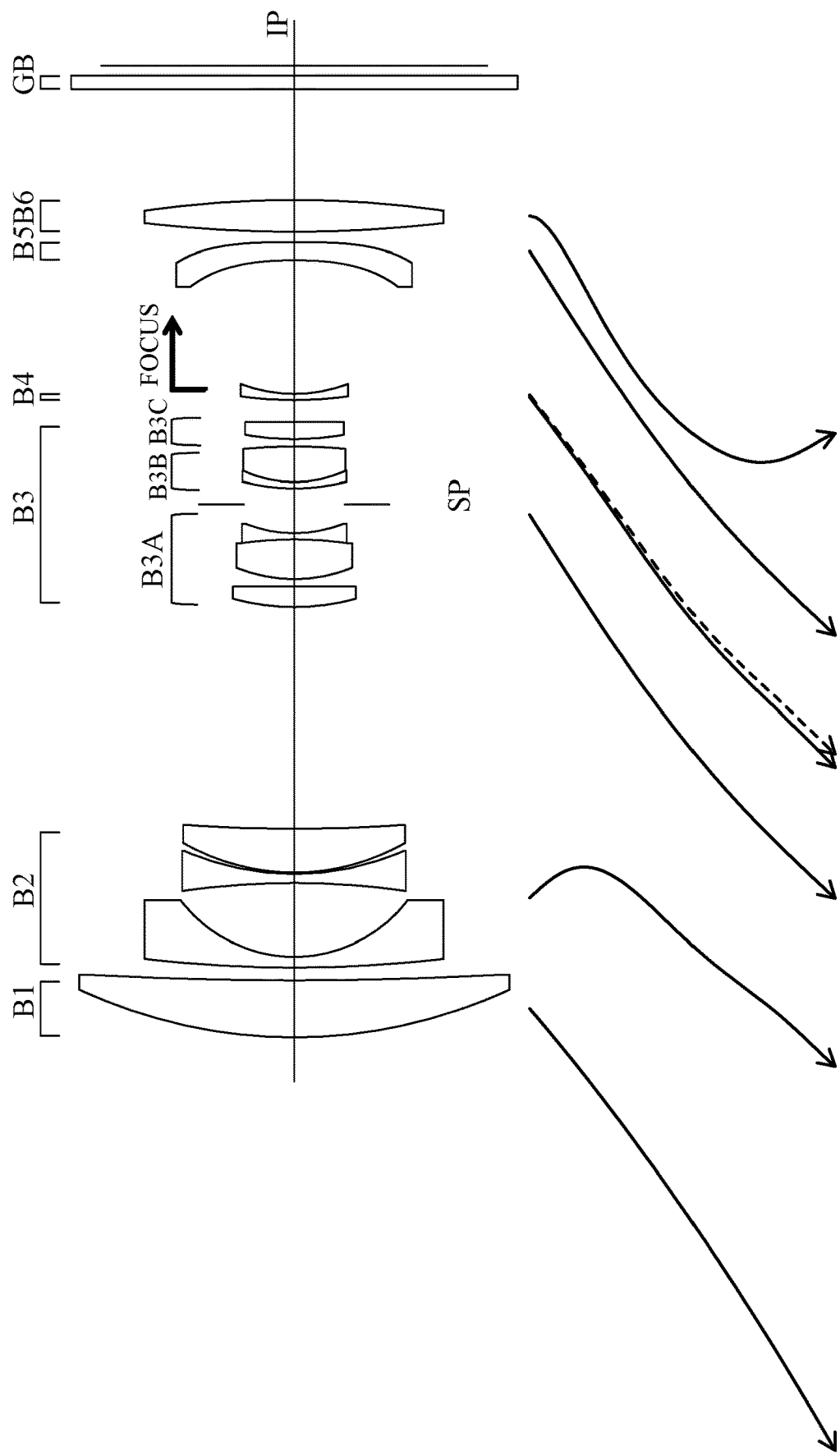
FIG. 1 is a lens sectional view of a zoom lens according to Example 1 of the present invention.

A zoom lens according to each example is an image pickup lens system usable for an image pickup apparatus using a solid-state image sensor such as a video camera, a digital still camera, a TV camera, and a surveillance camera, or a camera such as a camera using a silver halide film. The zoom lens according to each example is also usable for a projection optical system for a projection apparatus (projector).

In order to meet the above requirements, it is important to properly set a zoom type, a movable lens unit during zooming, a lens configuration, and a lens arrangement for the image stabilization.

Since it is generally necessary for the image stabilization to dispose a mechanical drive structure using a magnetic force of a motor or the like for moving the lens unit around the lens, a compact image stabilization lens unit is important to make compact the whole product.

It is generally known that a zoom lens that includes, in order from the object side to the image side, a first lens unit having a positive refractive power, a second lens unit having a strong negative refractive power, a third lens unit having a positive refractive power, and a plurality of subsequent lens units (a rear unit having a plurality of lens units) is likely to provide a compact zoom lens with a high zoom ratio and a high optical performance.

In the lens sectional views (FIGS. 1, 4, and 7) according to each example described below, the left side is the object side (front) and the right side is the image side (rear). Assume that "i" is the order of the lens units counted from the object side. Then, Bi represents an i-th lens unit (i-th subunit). In the lens sectional view, the subunits included in the third lens unit are, in order from the object side, a 3A-th lens unit (3A-th or first subunit) B3A, a 3B-th lens unit (3B-th or second subunit) B3B, and a 3C-th lens unit (3C-th or third subunit) B3C. In the lens sectional view, "Focus" represents a focus unit, and a moving direction of the focus unit from infinity to the close side is indicated by an arrow.

SP represents an aperture stop (diaphragm). GB represents an optical block corresponding to an optical filter, a face plate, a low-pass filter, an infrared cutting filter, or the like. IP represents an image plane. The image plane IP corresponds to an imaging plane of a solid-state image sensor (photoelectric conversion element) such as a CCD sensor and a CMOS sensor when a zoom lens is used as an image pickup optical system in a video camera or a digital camera. When a zoom lens is used as an imaging optical system in a film-based camera, it corresponds to the film plane.

The arrow shows a moving locus of each lens unit during zooming (magnification variation) from the wide-angle end to the telephoto end.

In the spherical aberration diagrams (FIGS. 2A to 2C, 5A to 5C, and 8A to 8C) according to each example, a solid line represents the d-line (wavelength 587.6 nm) and an alternate long and two short dashes line represents the g-line (wavelength 435.8 nm). In the astigmatism diagrams (FIGS. 2A to 2C, 5A to 5C, and 8A to 8C) according to each example, a solid line represents a sagittal image plane for the d-line, and a dotted line represents a meridional image plane for the d-line. The distortion aberrations (FIGS. 2A to 2C, 5A to 5C, and 8A to 8C) according to each example are shown for the d-line. The lateral chromatic aberration diagrams (FIGS. 2A to 2C, 5A to 5C, and 8A to 8C) according to each example show the g-line. In each of the following examples, the wide-angle end and the telephoto end refer to zoom positions when the magnification varying lens units are located at both ends of a mechanically movable range on the optical axis.

The lateral aberration diagrams (FIGS. 3A to 3C, 6A to 6C, and 9A to 9C) according to each embodiment showing the aberrational variations in the image stabilizing state show the center of the image height and upper and lower image heights, and each solid line represents the meridional lateral aberration for the d-line, and the broken line represents the sagittal lateral aberration.

Each example of the present invention consists of, in order from the object side to the image side, a first lens unit B1 having a positive refractive power, a second lens unit B2 having a negative refractive power, a third lens unit B3 having a positive refractive power, and (a rear unit) a plurality of subsequent lens units, and a distance between adjacent lens units changes during zooming. In the present invention, the third lens unit includes, in order from the object side, at least a 3A-th lens unit B3A having a positive refractive power, a 3B-th lens unit B3B having a negative refractive power, and a 3C-th lens unit B3C having a positive refractive power, and performs the image stabilization by moving the 3B-th lens unit orthogonal to the optical axis during image pickup. The term "orthogonal," as used herein, is not limited to strictly orthogonal, but may cover a range that can be regarded as being orthogonal. In other words, the 3B-th lens unit may be moved during the image stabilization in a direction so as to have a component orthogonal to the optical axis. Hereinafter, this will be referred to as substantially orthogonal.

Due to the 3A-th lens unit having a strong positive refractive power, the 3B-th lens unit has a relatively small diameter in the entire system, so that the mechanical structure for the image stabilization and thus the whole system can also be made compact. The 3C-th lens unit having a positive refractive power enables the refractive power of the 3B-th lens unit to be adjusted to an amount suitable for the image stabilization.

The 3B-th lens unit includes at least one negative lens and at least one positive lens. Thereby, particularly the chromatic aberration can be satisfactorily corrected during the image stabilization. During zooming from the wide-angle end to the telephoto end, all the lens units move and thereby suppress the aberrational variations even with a high zoom ratio.

Each example satisfies the following conditional expression:

$$0.80 < f3/|f2| < 1.29 \quad (1)$$

where f2 is a focal length of the second lens unit, and f3 is a focal length of the third lens unit, and satisfying this conditional expression can realize a higher zoom ratio and a higher performance, and suppress the aberrational fluctuations during the image stabilization.

The conditional expression (1) defines a range of the focal lengths of the third lens unit and the second lens unit by a ratio. If the absolute value of the focal length of the second lens unit becomes smaller beyond the upper limit of the conditional expression (1), it becomes difficult to correct the lateral chromatic aberration and the distortion especially at the wide-angle end. If the absolute value of the focal length of the second lens unit becomes larger beyond the lower limit of the conditional expression (1), the aberration will be easily suppressed but a moving amount of each lens unit tends to increase un order to secure a desired zoom amount, resulting in an increase in size of the entire system.

The following conditional expression may be satisfied:

$$0.60 < f3/fw < 1.30 \quad (2)$$

where f3 is a focal length of the third lens unit having a positive refractive power and fw is a focal length of the entire system (zoom lens) at the wide-angle end.

The conditional expression (2) defines a range of the focal lengths of the third lens unit and of the entire system at the wide-angle end by a ratio. If the absolute value of the focal length of the third lens unit becomes larger beyond the upper limit of the conditional expression (2), the aberration correction becomes easy but the diameter of the third lens unit becomes too large to make compact the image stabilization lens unit. If the absolute value of the focal length of the third lens unit becomes smaller beyond the lower limit of the conditional expression (2), it becomes difficult to correct the spherical aberration especially.

The following conditional expression may be satisfied:

$$0.50 < f3A/|f2| < 1.30 \quad (3)$$

where f3A is a focal length of the 3A-th lens unit having a positive refractive power, and f2 is a focal length of the second lens unit having a negative refractive power.

The conditional expression (3) defines a range of the focal length of the 3A-th lens unit and the second lens unit by a ratio. If the absolute value of the focal length of the 3A-th lens unit becomes larger beyond the upper limit of the conditional expression (3), the aberration correction becomes easy but the diameter of the 3B-th lens unit becomes too large to make compact the image stabilization lens unit. If the absolute value of the focal length of the 3A-th lens unit becomes smaller beyond the lower limit of conditional expression (3), the miniaturization is available but it becomes difficult to correct the spherical aberration especially.

The following conditional expression may be satisfied:

$$0.40 < f3B/f3C < 1.10 \quad (4)$$

where f3C is a focal length of the 3B-th lens unit having a positive refractive power and f3C is a focal length of the 3C-th lens unit having a positive refractive power.

The conditional expression (4) defines a range of the focal lengths of the 3B-th lens unit and the 3C-th lens unit by a ratio. If the absolute value of the focal length of the 3B-th lens unit becomes larger beyond the upper limit of the conditional expression (4), it is difficult to secure the refractive power necessary for the image stabilization and the moving amount during the image stabilization becomes too large to make compact the entire system. If the absolute value of the focal length of the 3B-th lens unit becomes smaller beyond the lower limit of the conditional expression (4), the refractive power becomes too high and the mechanical structure for the image stabilization becomes too complicated to achieve the compact structure.

The following conditional expression may be satisfied:

$$1.20 < f3B/|f2| < 2.00 \quad (5)$$

where f3B is a focal length of the 3B-th lens unit having a positive refractive power and f2 is a focal length of the second lens unit having a negative refractive power.

The conditional expression (5) defines a range of the focal lengths of the 3B-th lens unit and the second lens unit by a ratio. If the absolute value of the focal length of the 3B-th lens unit becomes larger beyond the upper limit of the conditional expression (5), it is difficult to secure the refractive power necessary for the image stabilization, and the moving amount during the image stabilization becomes too large to make the entire system compact. If the absolute value of the focal length of the 3B-th lens unit becomes smaller beyond the lower limit of the conditional expression (5), the coma aberration fluctuations during the image stabilization becomes larger.

The following conditional expression may be satisfied:

$$0.80 < f1/ft < 1.30 \quad (6)$$

where f1 is a focal length of the first lens unit having a positive refractive power and ft is a focal length of the entire system at the telephoto end.

The conditional expression (6) defines a range of the focal lengths of the first lens unit and the entire system at the telephoto end by a ratio. If the absolute value of the focal length of the first lens unit becomes larger beyond the upper limit of the conditional expression (6), the moving amount of the first lens unit increases in order to secure a desired magnification varying amount, and it is difficult to make compact the entire system. If the absolute value of the focal length of the first lens unit becomes smaller beyond the lower limit of the conditional expression (6), it becomes easy to secure the magnification varying amount but it becomes difficult to correct the spherical aberration and longitudinal chromatic aberration at the telephoto end.

The following conditional expression may be satisfied:

$$4.20 < f1/|f2| < 5.30 \quad (7)$$

where f1 is a focal length of the first lens unit having a positive refractive power, and f2 is a focal length of the second lens unit having a negative refractive power.

The conditional expression (7) defines a range of the focal lengths of the first lens unit and the second lens unit by a ratio. If the absolute value of the focal length of the first lens unit becomes larger beyond the upper limit of the conditional expression (7), the moving amount of the first lens unit increases to secure a desired magnification varying amount, and it becomes difficult to make compact the entire system. If the absolute value of the focal length of the first lens unit becomes smaller beyond the lower limit of the conditional expression (7), it becomes easy to secure the zoom amount, but it becomes difficult to correct the spherical aberration and longitudinal chromatic aberration at the telephoto end.

One negative lens may be disposed on the image side of the 3C-th lens unit and moved on the optical axis during focusing. Since the off-axis ray is low and a small lens can be disposed near the 3C-th lens unit, the focus lens itself and the drive mechanism and therefore the entire system can be made compact. Then, the following conditional expression may be satisfied:

$$0.90 < ff/f2 < 1.70 \quad (8)$$

where ff is a focal length of the focus unit having the negative refractive power and f2 is a focal length of the second lens unit having the negative refractive power.

The conditional expression (8) defines a range of the focal lengths of the focus unit and the second lens unit by a ratio. If the absolute value of the focal length of the focus unit becomes larger beyond the upper limit of the conditional expression (8), the moving amount of the focus unit increases in order to secure a desired extension amount, and it becomes difficult to make compact the entire system. If the absolute value of the focal length of the first lens unit becomes smaller beyond the lower limit of the conditional expression (8), it becomes easy to secure the moving amount but it becomes difficult to correct the field curvature variations associated with the variation of the object distance.

In the zoom lens according to the present invention, the lens unit closest to the image may have a positive refractive power and may consist of a single lens.

Generally, the electronic image sensor vertically receive incident light, and the off-axis light incident on the image sensor can be made closer to vertical by using the lens unit disposed closest to the image which has a positive refractive power. Then, the following conditional expression may be satisfied:

$$1.00 < f1/fr < 1.70 \quad (9)$$

where f1 is a focal length of the first lens unit having a positive refractive power, and fr is a focal length of the lens unit having a positive refractive power disposed closest to the image in the entire system.

The conditional expression (9) defines a range of the focal lengths of the first lens unit and the lens unit closest to the image by a ratio. If the absolute value of the focal length of the first lens unit becomes larger beyond the upper limit of the conditional expression (9), the moving amount of the first lens unit increases to secure a desired magnification varying amount, and it becomes difficult to make compact the entire system. If the absolute value of the focal length of the first lens unit becomes smaller beyond the lower limit of the conditional expression (9), it becomes easy to secure the magnification varying amount, but it becomes difficult to correct the spherical aberration and longitudinal chromatic aberration at the telephoto end.

The 3B-th lens unit may consist of one lens having a negative refractive power and one lens having a positive refractive power. This is because by reducing the weight of the lens that performs the image stabilization, the mechanical structure for the correction and the entire system can be made compact.

The 3B-th lens unit may consist of a cemented lens of one lens having a negative refractive power and one lens having a positive refractive power. The cemented lens can easily suppress the axial misalignment of the lens during the lens assembly in the manufacture.

Using an aspherical lens for the second lens counted from the image side is effective to correcting the curvature of field. The curvature of field can be effectively corrected by disposing the second lens counted from the image side at a location where the off-axis ray is high. Then, when the aspherical lens is made of a resin material, the resin material closest to the image is more affected by scratches and stains than the glass material. Therefore, the aspherical lens may be disposed around the position of the second lens. Since the lens closest to the image has a large outer diameter and the manufacturing cost increases, the above configuration may be used even if it is made of a glass material.

The second lens counted from the image side and made of the aspherical lens can be inexpensively manufactured.

The 3C-th lens unit may consist of a single lens. When the 3B-th lens unit is set to the image stabilization lens unit and the lens unit located on the image side of the 3C-th lens unit is set to the focus lens, the 3C-th lens unit is disposed in the middle of the lens unit having the driving mechanism, and the spatial restrictions become severe. Thus, the 3C-th lens unit may consist of a single lens.

The diaphragm may be located on the image side of the 3A-th lens unit. The diaphragm disposed on the image side of the 3A-th lens unit can be disposed at a location with a relatively small diameter in the entire system, and the entire system can be easily made compact.

The numerical ranges of the conditional expressions (1) to (9) may be set as follows.

| | |
|---|---|
| $0.90 < f3/|f2| < 1.28$ | (1a) |
| $0.80 < f3/fw < 1.25$ | (2a) |
| $0.60 < f3A/|f2| < 1.20$ | (3a) |
| $0.45 < f3B/f3C < 1.00$ | (4a) |
| $1.30 < f3B/|f2| < 1.90$ | (5a) |
| $0.90 < f1/ft < 1.20$ | (6a) |
| $4.40 < f1/|f2| < 5.20$ | (7a) |
| $0.95 < ff/f2 < 1.60$ | (8a) |
| $1.10 < f1/fr < 1.60$ | (9a) |

The numerical ranges of conditional expressions (1a) to (9a) may be set as follows.

| | |
|---|---|
| $0.95 < f3/|f2| < 1.27$ | (1b) |
| $0.85 < f3/fw < 1.20$ | (2b) |
| $0.70 < f3A/|f2| < 1.10$ | (3b) |
| $0.50 < f3B/f3C < 0.85$ | (4b) |
| $1.50 < f3B/|f2| < 1.80$ | (5b) |
| $0.95 < f1/ft < 1.10$ | (6b) |
| $4.50 < f1/|f2| < 5.10$ | (7b) |
| $1.00 < ff/f2 < 1.55$ | (8b) |
| $1.25 < f1/fr < 1.50$ | (9b) |

As described above, each example according to the present invention can provide a compact zoom lens having a high zoom ratio, a good optical performance over the entire zoom range from the wide-angle end to the telephoto end, and an image stabilization mechanism.

Each example for carrying out the present invention will be described below with reference to the accompanying drawings.

Example 1

FIG. 1 is a lens sectional view of a zoom lens according to Example 1 of the present invention at a wide-angle end (short focal length end).

Figure 2A:
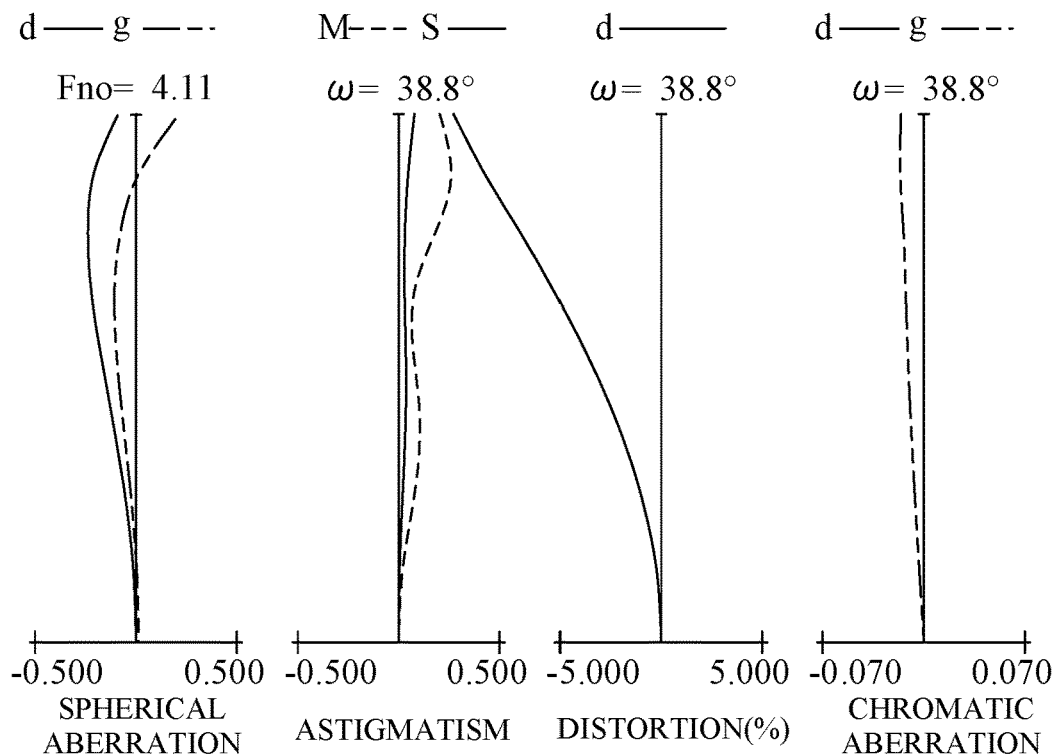
FIGS. 2A to 2C are aberration diagrams of the zoom lens according to Example 1 of the present invention at a wide-angle end, a middle position, and a telephoto end, respectively, when focused on infinity.
Figure 2B:
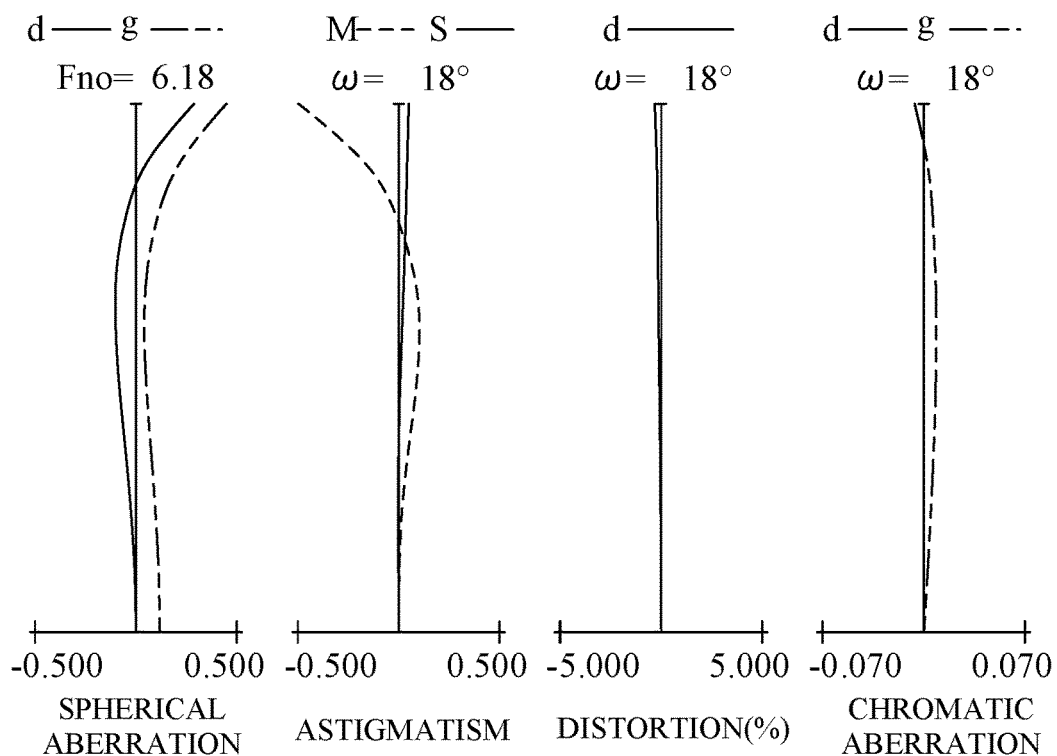
Figure 2C:
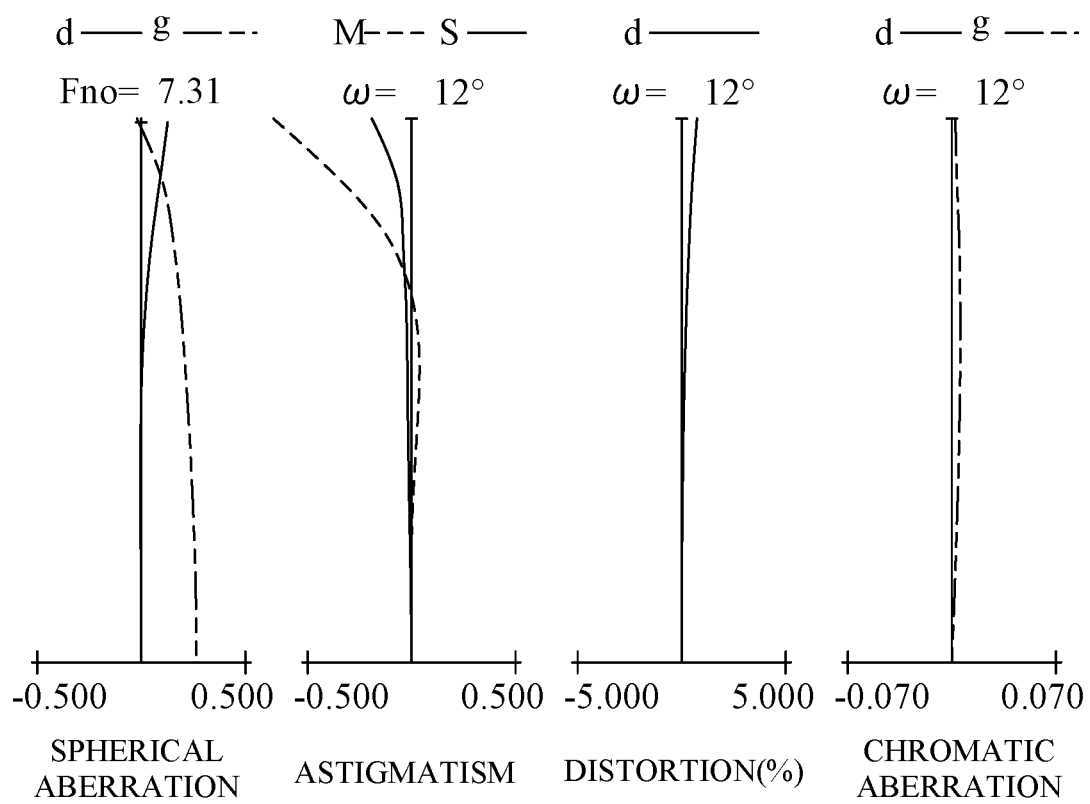

FIGS. 2A to 2C are aberration diagrams of the zoom lens according to Example 1 at the wide-angle end, a middle zoom position, and a telephoto end (long focal length end) when focused on infinity.

Example 1 relates to a zoom lens with a zoom ratio of 4.1 times. The zoom lens according to Example 1 consists of six lens units (B1-B6) as a whole, and the third lens unit consists of a 3A-th lens unit located on the object side of the diaphragm, a 3B-th lens unit located on the image side of the diaphragm, and a 3C-th lens unit closer to the image. Then, the camera shake is suppressed by moving the 3B-th lens unit substantially orthogonal to the optical axis.

Figure 3A:
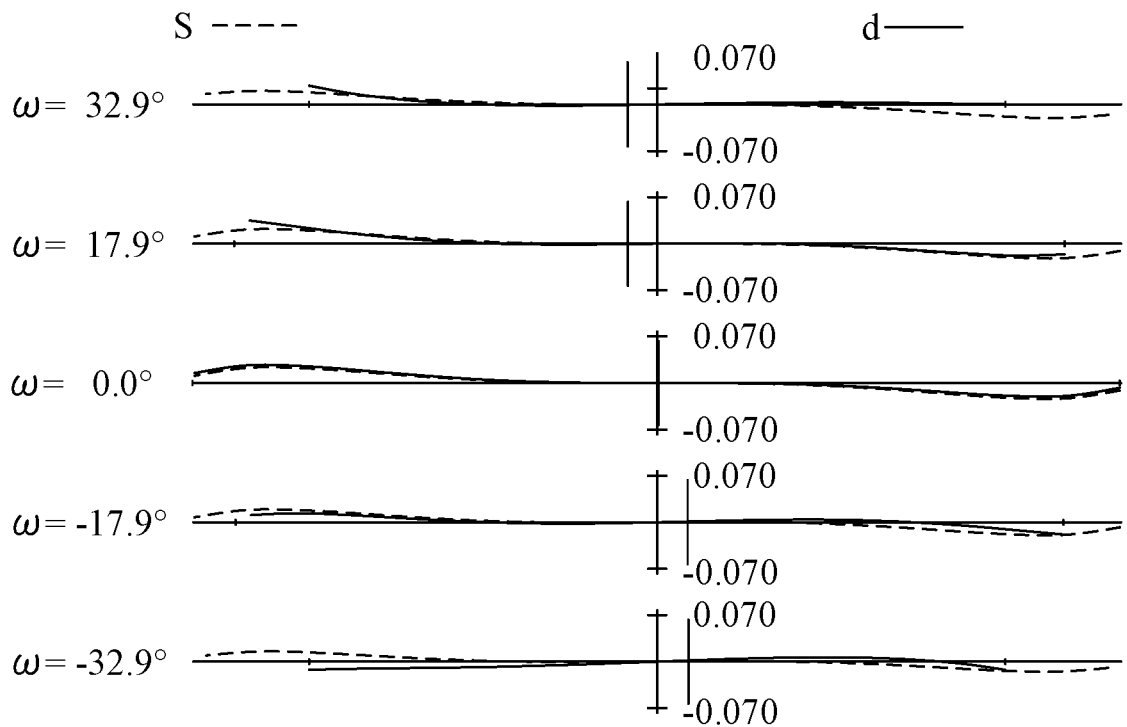
FIGS. 3A to 3C are lateral aberration diagrams of the zoom lens according to Example 1 of the present invention at the wide-angle end, the middle position, and the telephoto end, respectively, when focused on infinity with an image stabilization of 0.3 degrees.
Figure 3B:
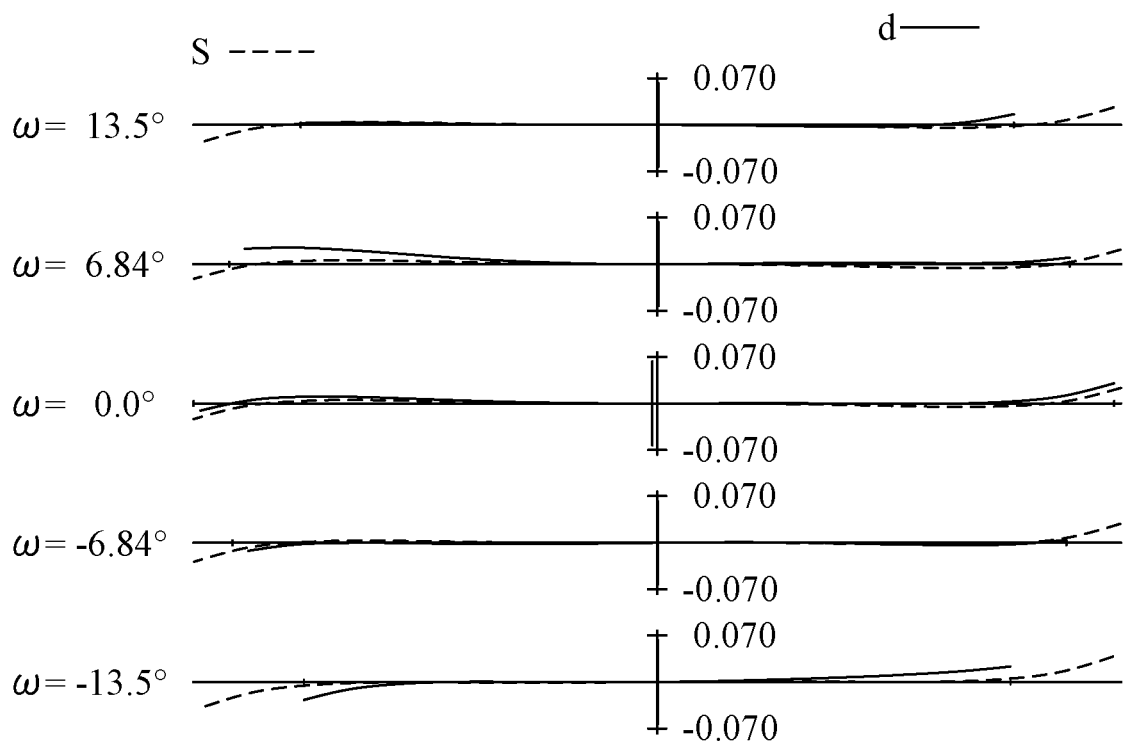
Figure 3C:
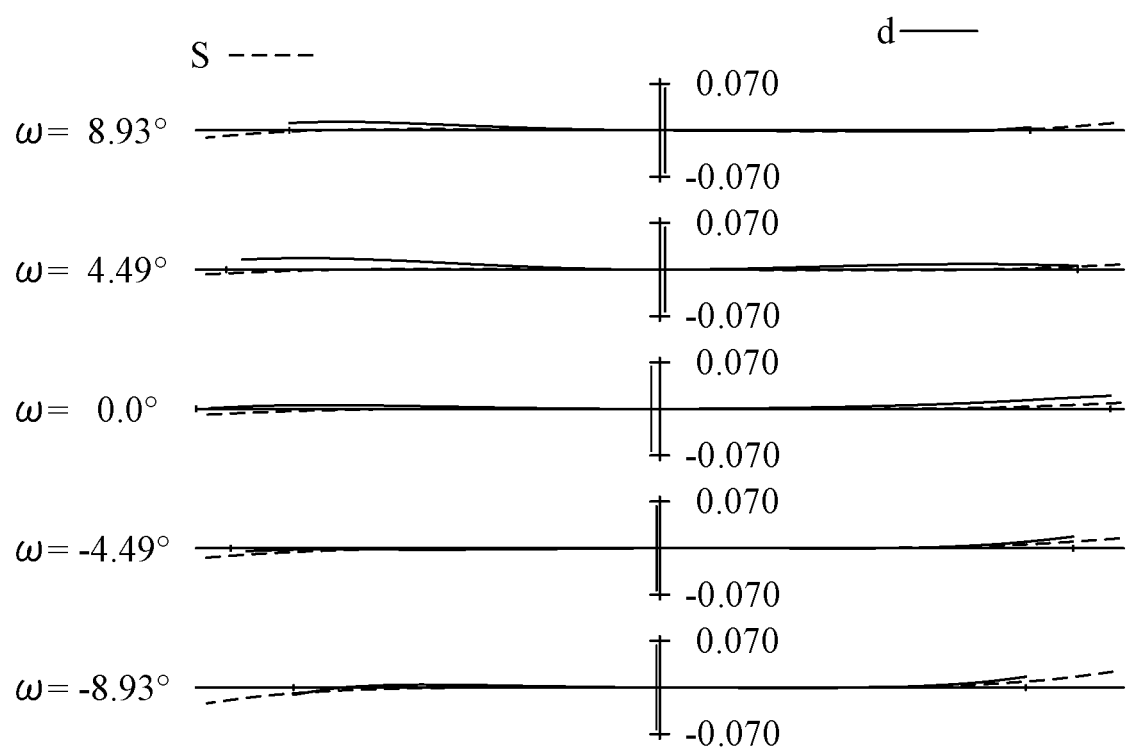

FIGS. 3A to 3C are lateral aberration diagrams of the zoom lens according to Example 1 at the wide-angle end, the middle zoom position, and the telephoto end (long focal length end), respectively, when focused on infinity with the image stabilization at a tilt of the optical axis of about 0.3 degrees. Zooming is made by moving all the lens units, and focusing is made by moving the fourth lens unit having a negative refractive power on the optical axis.

Example 2

Figure 4:
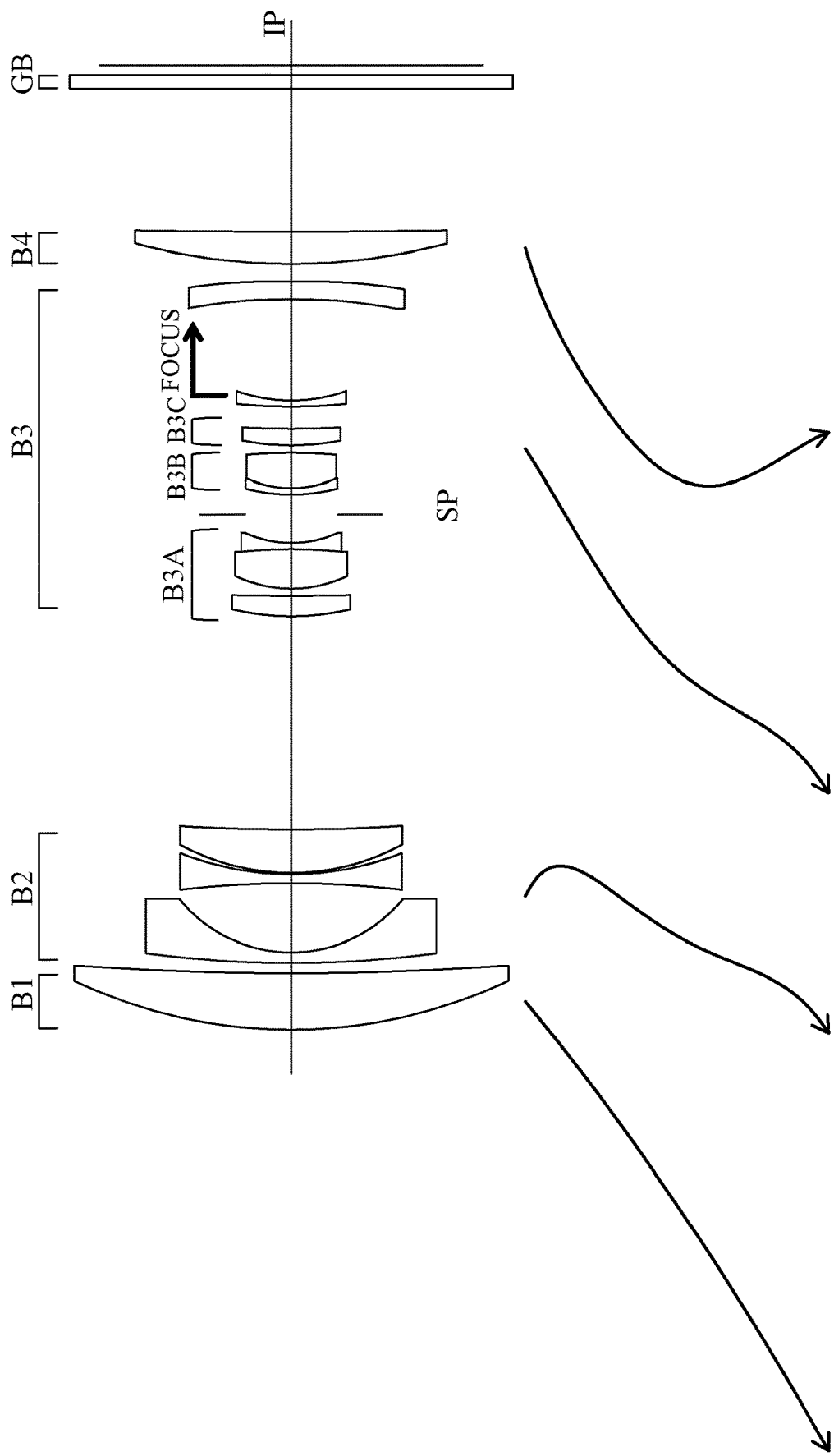
FIG. 4 is a lens sectional view of a zoom lens according to Example 2 of the present invention.

FIG. 4 is a lens sectional view at the wide-angle end (short focal length end) of the zoom lens according to Example 2 of the present invention.

Figure 5A:
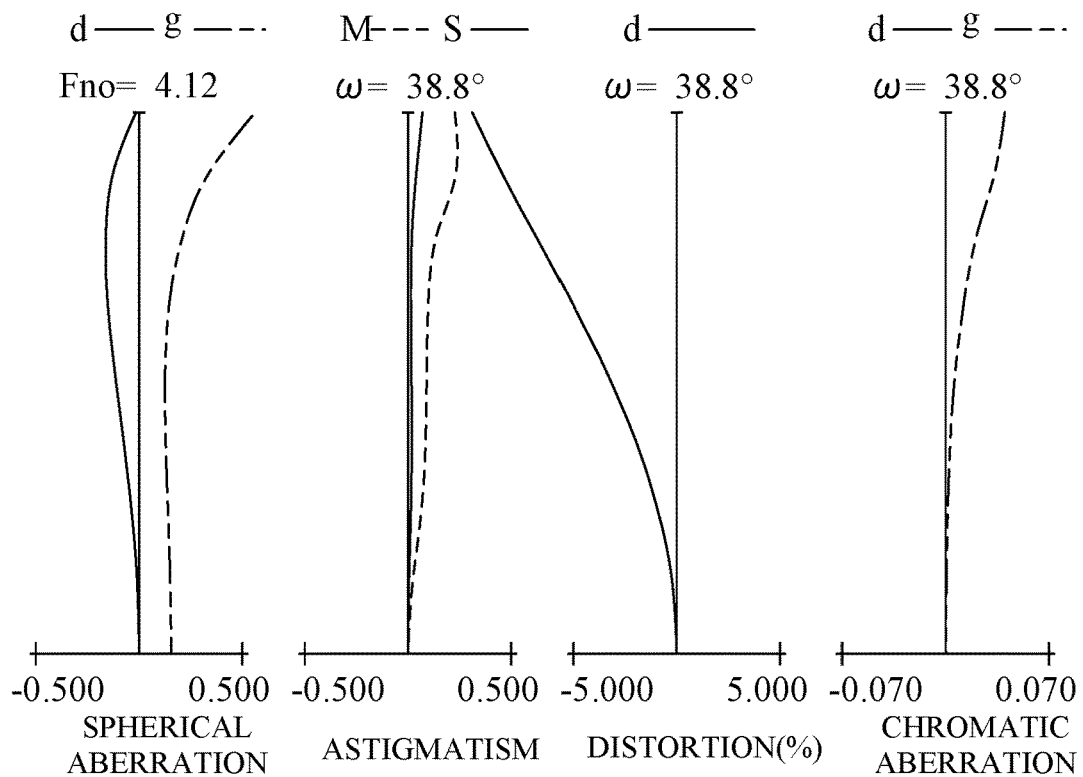
FIGS. 5A to 5C are aberration diagrams of the zoom lens according to Example 2 of the present invention at a wide-angle end, a middle position, and a telephoto end, respectively, when focused on infinity.
Figure 5B:
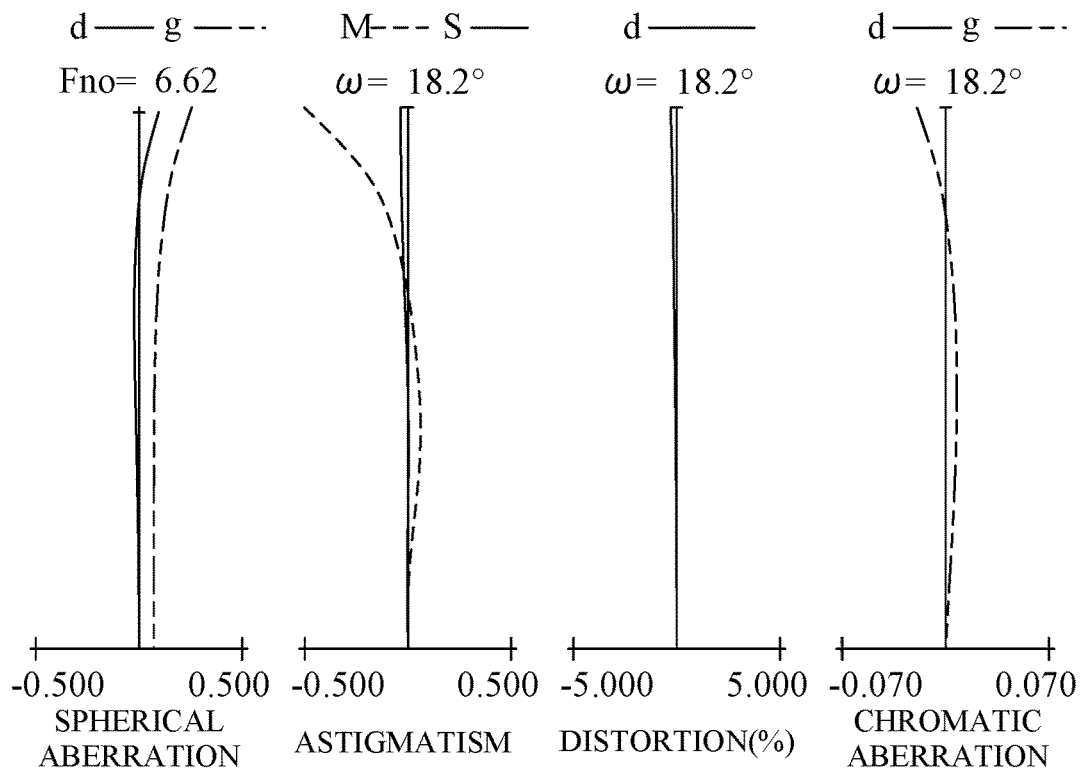
Figure 5C:
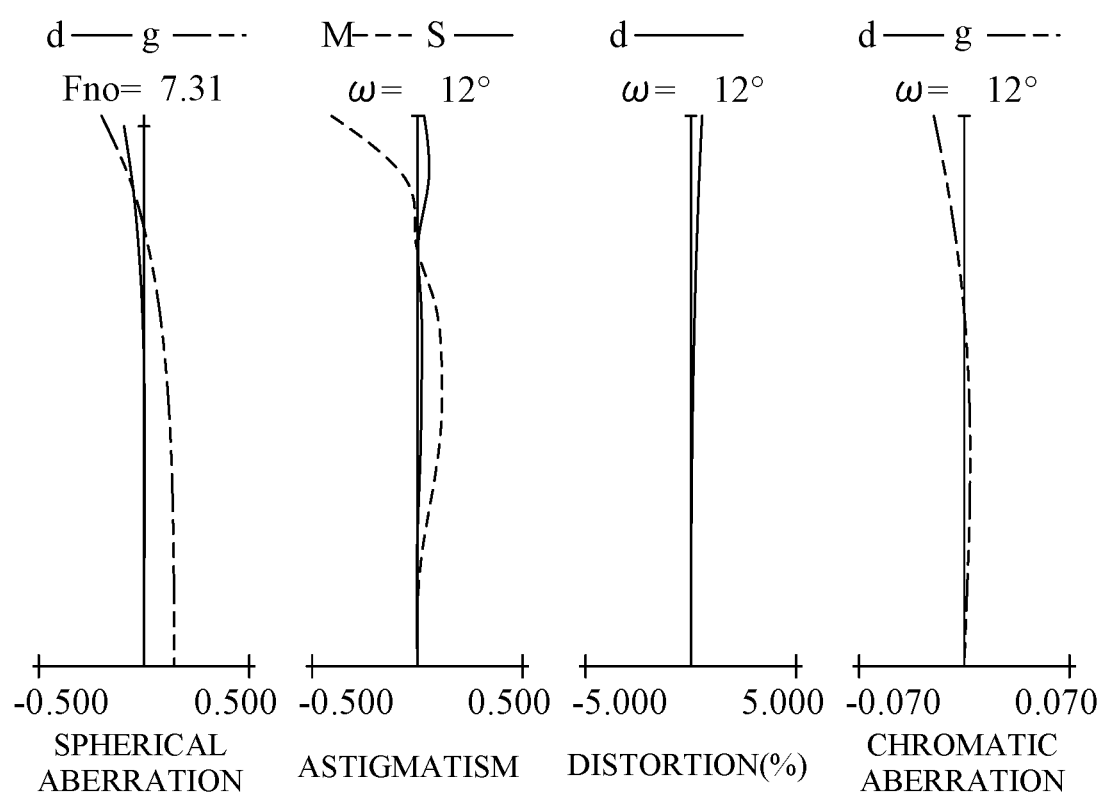

FIGS. 5A to 5C are aberration diagrams of the zoom lens according to Example 2 at the wide-angle end, a middle zoom position, and a telephoto end (long focal length end), respectively, when focused on infinity.

Example 2 relates to a zoom lens with a zoom ratio of 4.1 times. The zoom lens according to Example 2 consists of four lens units (B1-B4) as a whole, and the third lens unit consists of a 3A-th lens unit located on the object side of the diaphragm, a 3B-th lens unit located on the image side of the diaphragm, a 3C-th lens unit closer to the image, and a lens further closer to the image. Then, the camera shake is suppressed by moving the 3B-th lens unit substantially orthogonal to the optical axis.

Figure 6A:
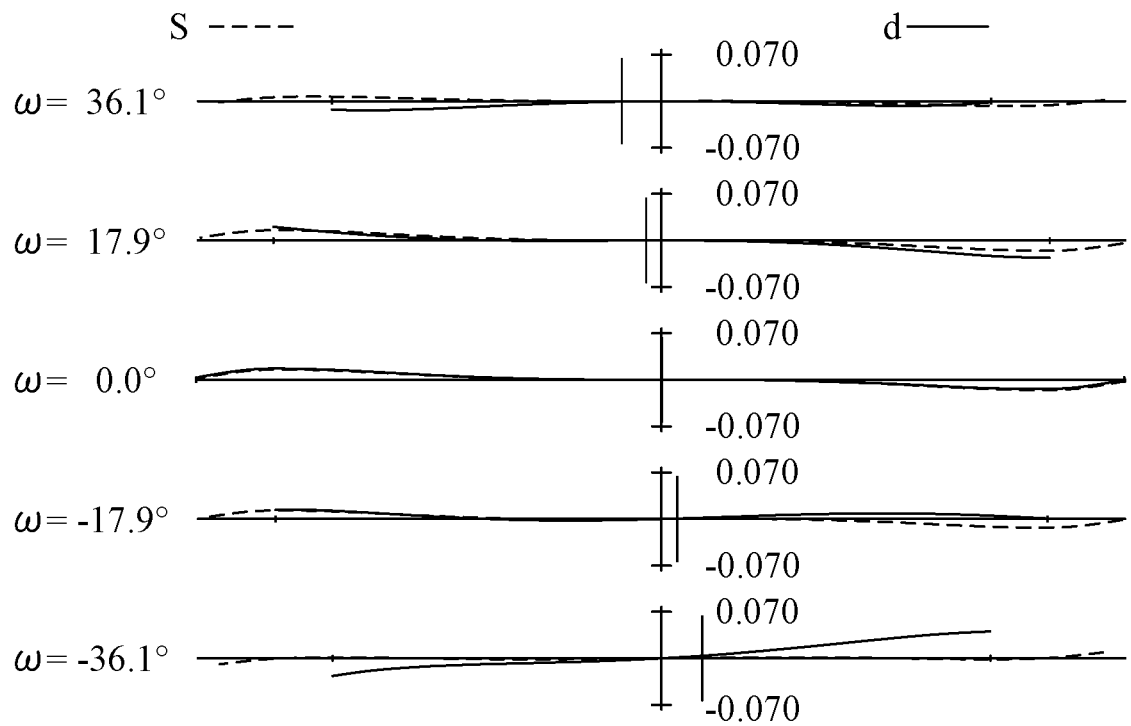
FIGS. 6A to 6C are lateral aberration diagrams of the zoom lens according to Example 2 of the present invention at the wide-angle end, the middle position, and the telephoto end, respectively, when focused on infinity with an image stabilization of 0.3 degrees.
Figure 6B:
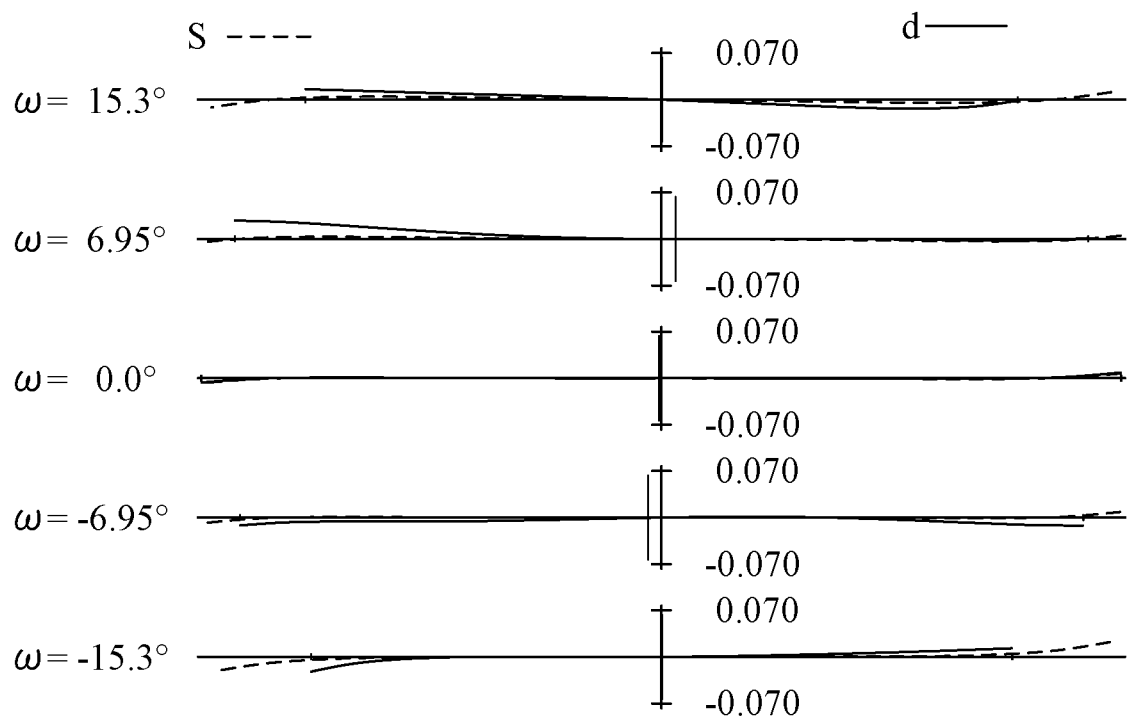
Figure 6C:
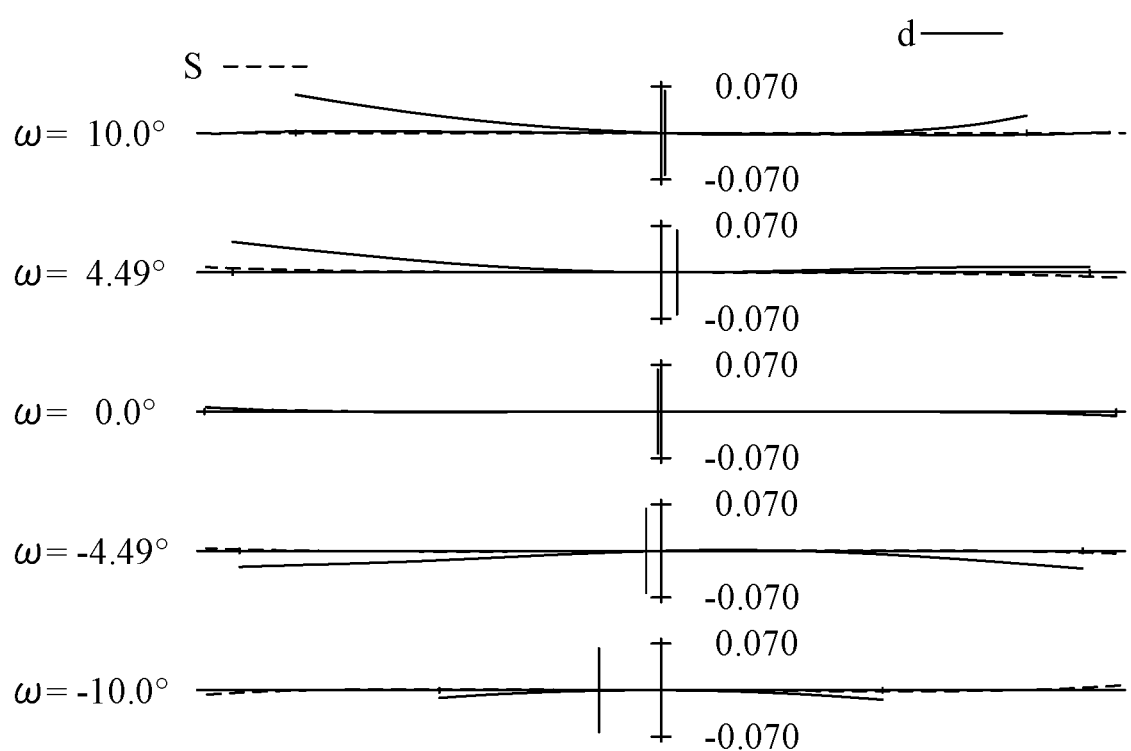

FIGS. 6A to 6C are lateral aberration diagrams of the zoom lens according to Example 2 at the wide-angle end, the middle zoom position, and the telephoto end (long focal length end), respectively, when focused on infinity. The moving amount of the 3B-th lens unit corresponds to the image stabilization at a tilt of the optical axis of about 0.3 degrees.

Zooming is made by moving all the lens units, and focusing is made by moving on the optical axis a subunit having a negative refractive power on the image side of the 3C-th lens unit.

Example 3

Figure 7:
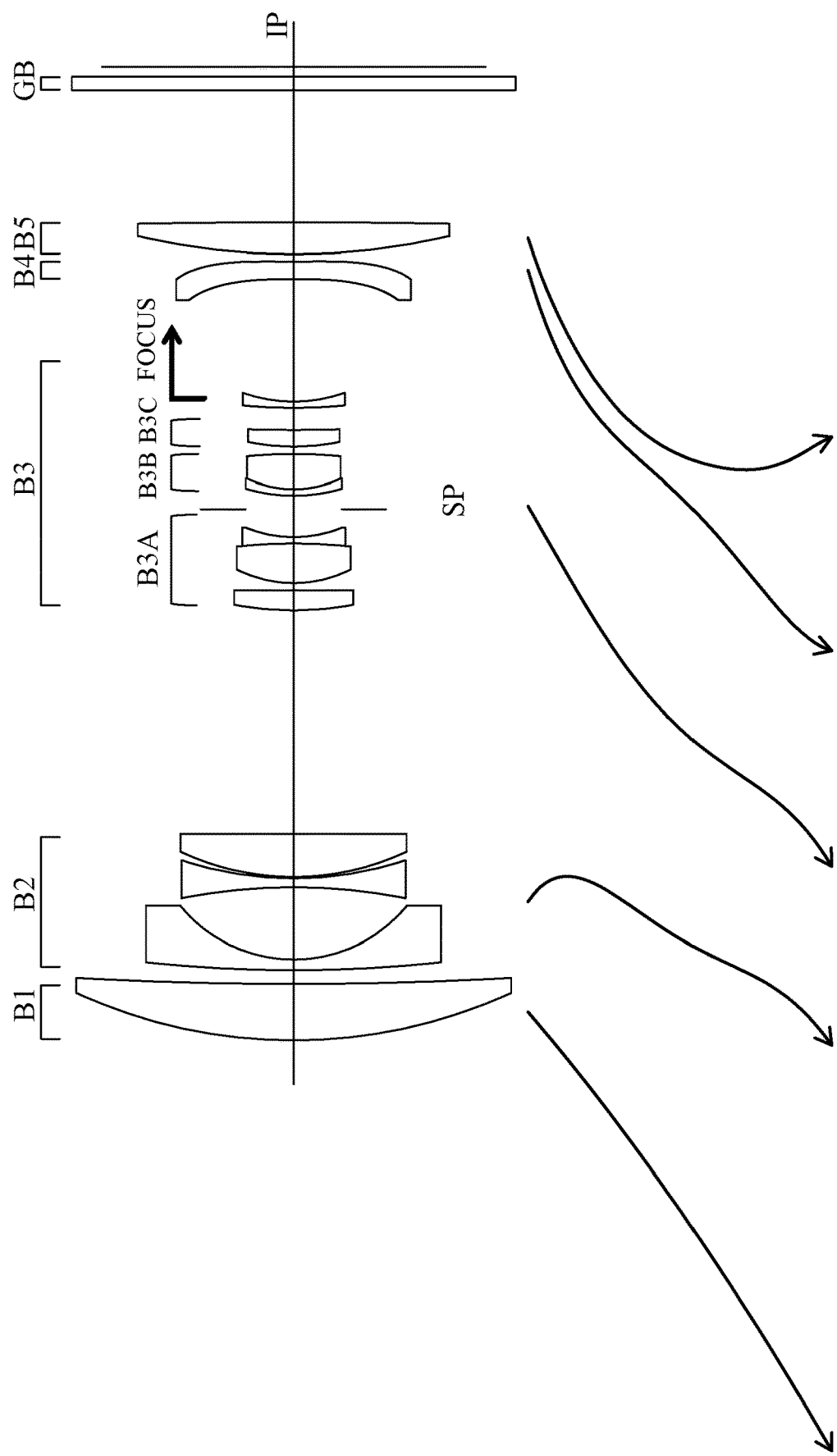
FIG. 7 is a lens sectional view of a zoom lens according to Example 3 of the present invention.

FIG. 7 is a lens sectional view of a zoom lens according to Example 3 of the present invention at a wide-angle end (short focal length end).

Figure 8A:
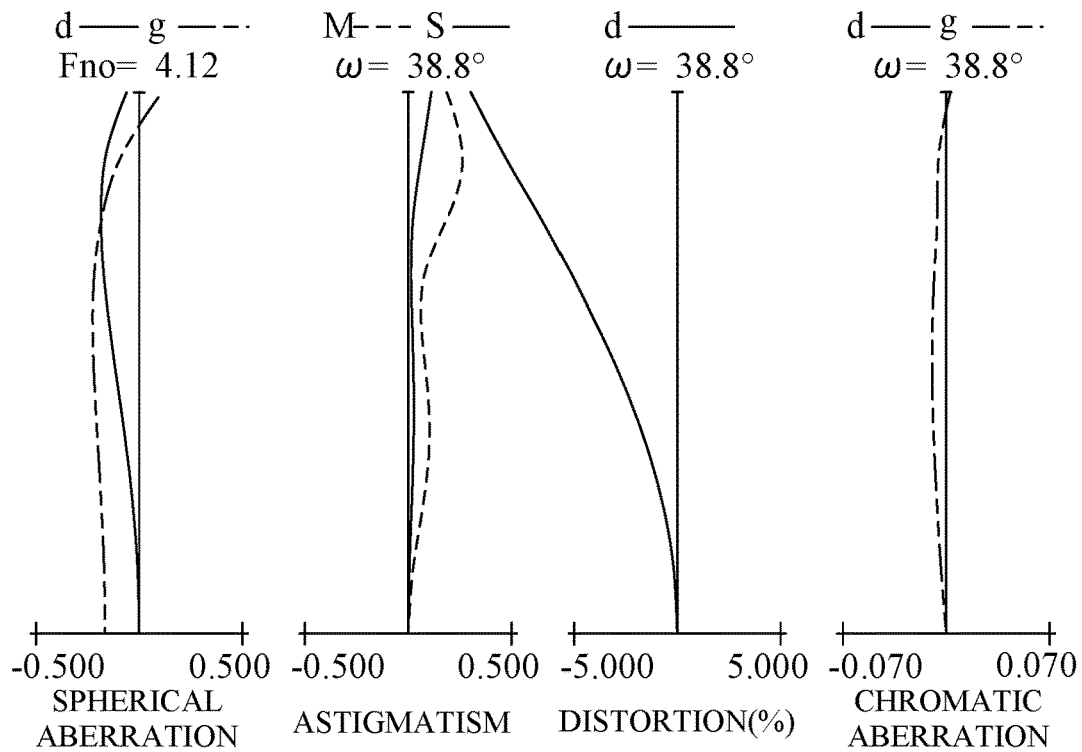
FIGS. 8A to 8C are aberration diagrams of the zoom lens according to Example 3 of the present invention at a wide-angle end, a middle position, and a telephoto end, respectively, when focused on infinity.
Figure 8B:
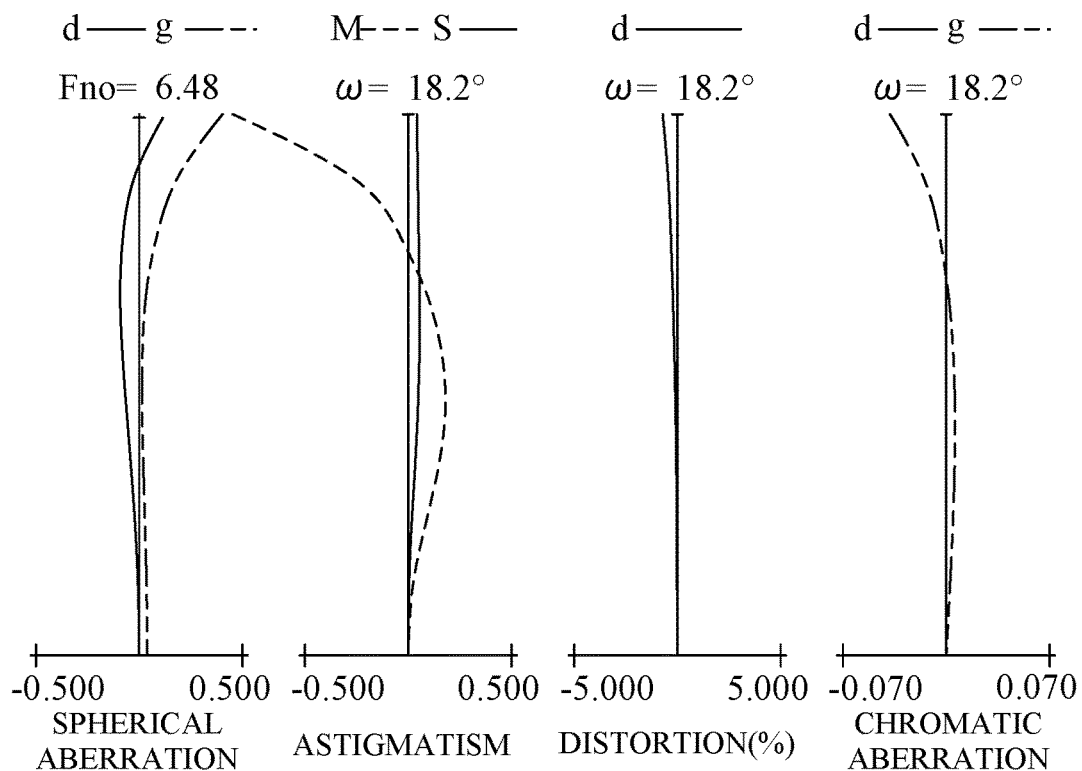
Figure 8C:
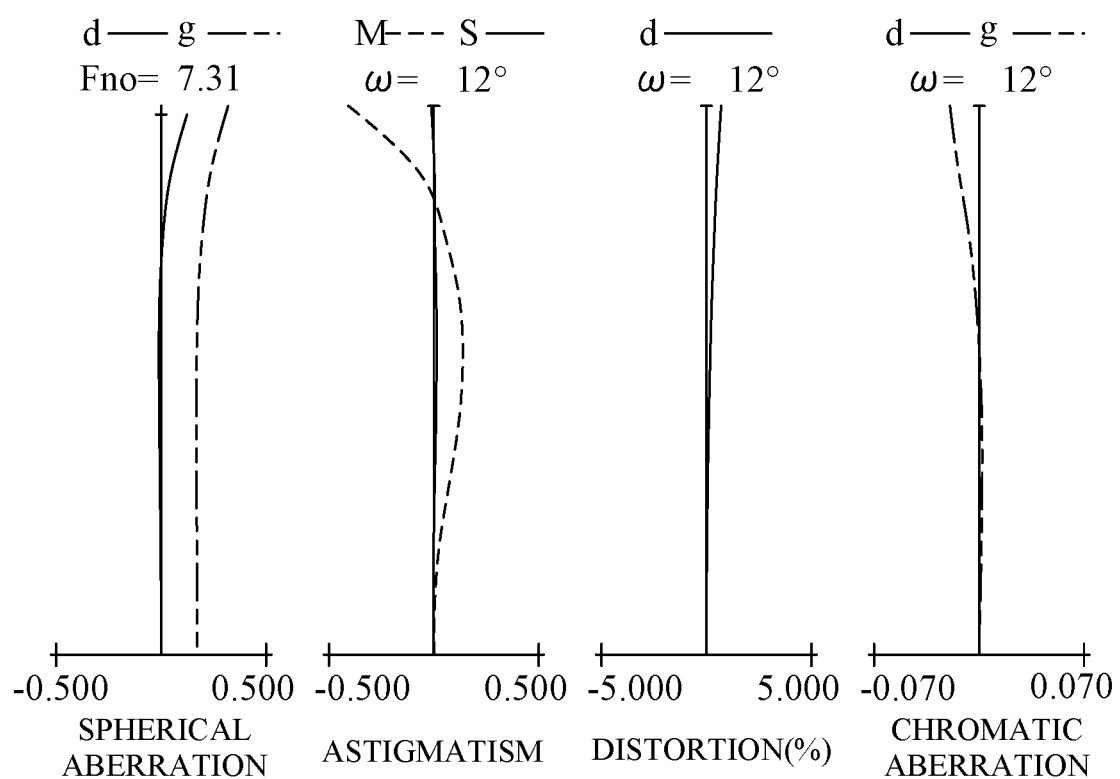

FIGS. 8A to 8C are aberration diagrams of the zoom lens according to Example 3 at the wide-angle end, a middle zoom position, and a telephoto end (long focal length end), respectively, when focused on infinity.

Example 3 relates to a zoom lens with a zoom ratio of 4.1 times. The zoom lens according to Example 3 consists of five lens units (B1-B5) as a whole, and the third lens unit consists of a 3A-th lens unit located on the object side of the diaphragm, a 3B-th lens unit located on the image side of the diaphragm, a 3C-th lens unit closer to the image, and a lens further closer to the image. Then, the camera shake is suppressed by moving the 3B-th lens unit substantially orthogonal to the optical axis.

Figure 9A:
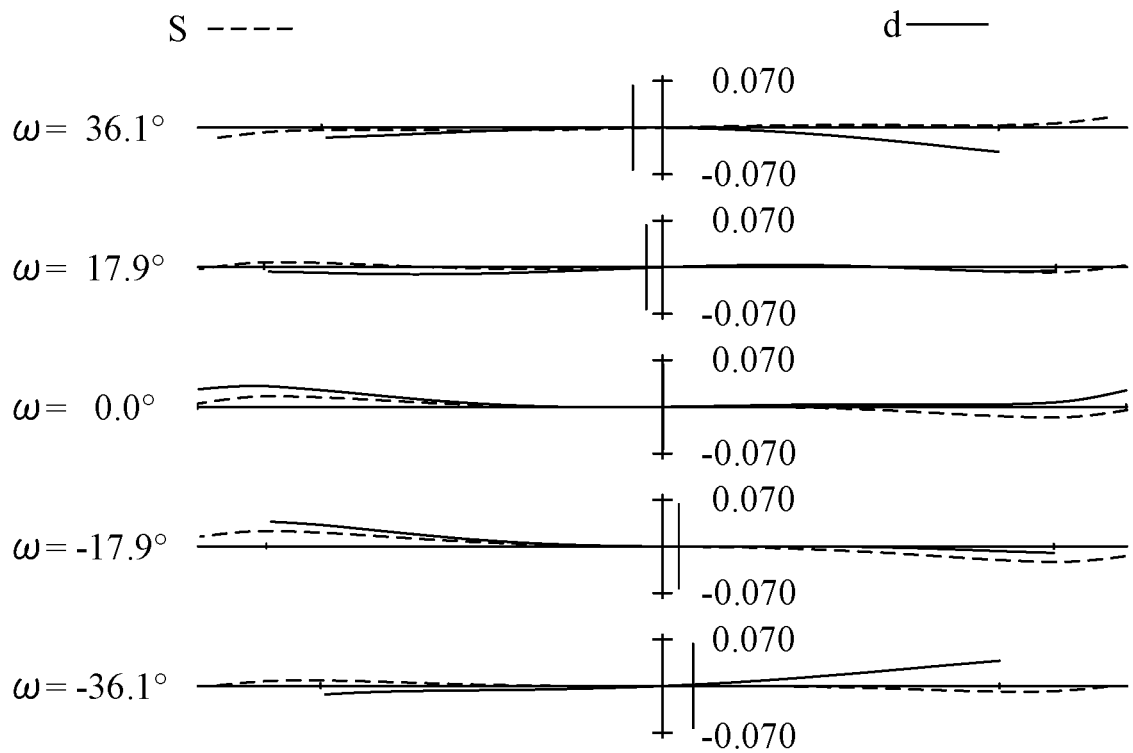
FIGS. 9A to 9C are lateral aberration diagrams of the zoom lens according to Example 3 of the present invention at the wide-angle end, the middle position, and the telephoto end, respectively, when focused on infinity with the image stabilization of 0.3 degrees.
Figure 9B:
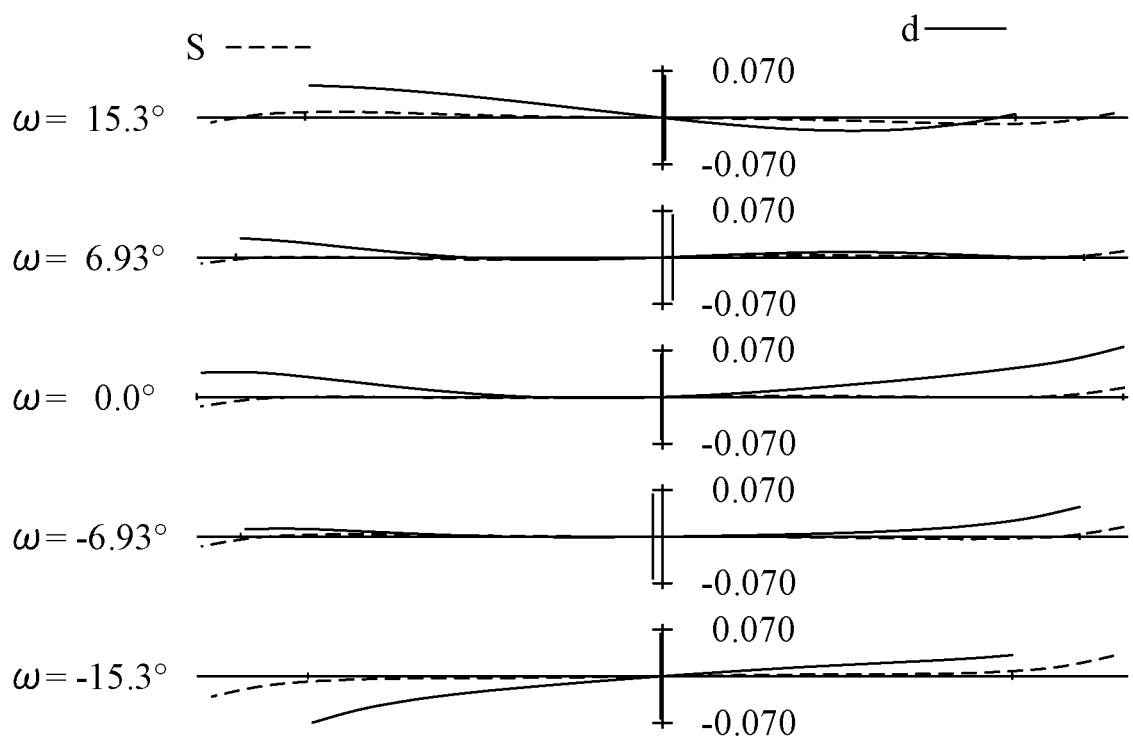
Figure 9C:
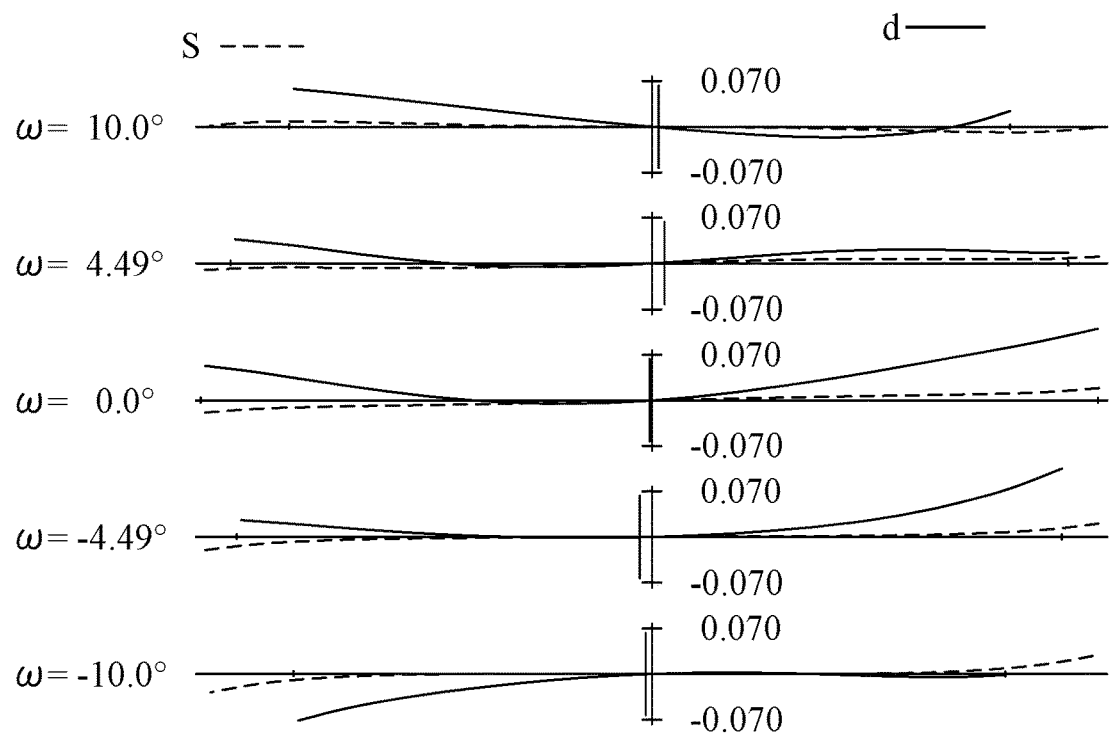

FIGS. 9A to 9C are lateral aberration diagrams of the zoom lens according to Example 3 at the wide-angle end, the middle zoom position, and the telephoto end (long focal length end), respectively, when focused on infinity, and the 3B-th lens unit is moved substantially orthogonal for the image stabilization. The moving amount of the 3B-th lens unit corresponds to the image stabilization at a tilt of the optical axis of about 0.3 degrees.

Zooming is made by moving all lens units, and focusing is made by moving on the optical axis a subunit having a negative refractive power on the image side of the 3C-th lens unit.

(Image Pickup Apparatus)

Figure 10:
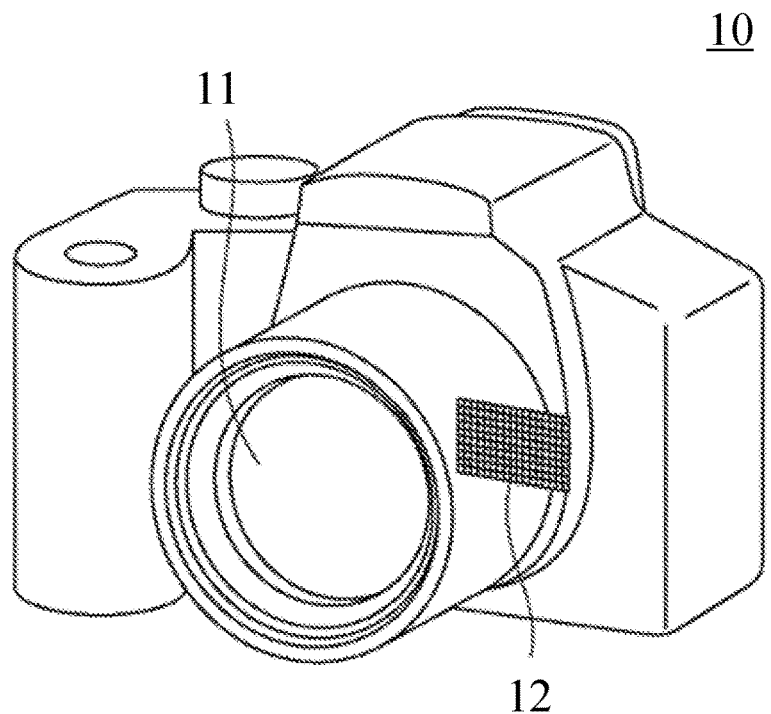
FIG. 10 is a schematic diagram of principal part in an image pickup apparatus according to the present invention

Referring now to FIG. 10, a description will be given of an example of a digital still camera (image pickup apparatus) using an optical system (zoom lens) according to the present invention as an image pickup optical system. In FIG. 10, reference numeral 10 denotes a camera body, and reference numeral 11 denotes an image pickup optical system including any one of the optical systems described in Examples 1 to 3. Reference numeral 12 denotes a solid-state image sensor (photoelectric conversion element), such as a CCD sensor and a CMOS sensor, which is built in the camera body and receives an optical image formed by the image pickup optical system 11 and photoelectrically converts it. The camera body 10 may be a so-called single-lens reflex camera having a quick turn mirror or a so-called mirrorless camera having no quick turn mirror.

An image pickup apparatus having a small lens can be obtained by thus applying the optical system of the present invention to the image pickup apparatus such as the digital still camera.

NUMERICAL EXAMPLE

Specific numerical data of numerical examples 1 to 3 corresponding to Examples 1 to 3 will be shown below.

In the surface data of each numerical example, r represents a radius of curvature of each optical surface, and d (mm) represents an axial distance (distance on the optical axis) between an m-th surface and an (m+1)-th surface. However, m-th is the number of the surface counted from the light incident side. Further, nd represents a refractive index of each optical element for the d-line, and vd represents an Abbe number of the optical element. The Abbe number vd of a certain material is represented as follows using refractive indexes Nd, NF, and NC for the d-line (587.6 nm), F-line (486.1 nm), and C-line (656.3 nm) of the Fraunhofer line.

$$vd=(Nd-1)/(NF-NC)$$

In each numerical example, d, focal length (mm), F-number, and half angle of view (°) are all values when the optical system according to each example focuses on an object at infinity. A "backfocus BF" is a distance on the optical axis from the final lens surface (lens surface closest to the image side) to the paraxial image plane, which is expressed in air equivalent length. An "overall lens length" is a length obtained by adding the backfocus to a distance on the optical axis from the frontmost surface (lens surface closest to the object) to the final surface of the zoom lens. The "lens unit" is not limited to a plurality of lenses, but may consist of a single lens. The wide angle indicates the wide-angle end, the middle indicates the middle zoom position, and the telephoto indicates the telephoto end.

When the optical surface is an aspherical surface, the symbol * is added to the right of the surface number. The aspherical shape is expressed as follows, where X is a displacement amount from the surface vertex in the optical axis direction, h is a height from the optical axis in the direction orthogonal to the optical axis, R is a paraxial radius of curvature, k is a conical constant, A4, A6, A8, A10 and A12 are aspherical coefficients:

$$X=(h^2/R)/[1+\{1-(1+k)(h/R)^2\}^{1/2}]+A4 \times h^4+A6 \times h^6+A8 \times h^8+A10 \times h^{10}+A12 \times h^{12}$$

Herein, "e±XX" in each aspherical coefficient means "×10$^{\pm XX}$".

Table 1 shows a relationship between each of the above conditional expressions and the numerical examples.

Numerical Example 1

| | UNIT mm | | | |
|---|---|---|---|---|
| | Surface data | | | |
| Surface number | r | d | nd | vd |
| 1 | 56.962 | 6.40 | 1.60311 | 60.6 |
| 2 | 421.715 | (variable) | | |
| 3 | 142.374 | 1.20 | 1.90366 | 31.3 |
| 4 | 15.994 | 8.29 | | |
| 5 | −85.062 | 1.00 | 1.60311 | 60.6 |
| 6 | 30.559 | 0.17 | | |
| 7 | 24.880 | 4.90 | 1.84666 | 23.9 |
| 8 | 162.207 | (variable) | | |
| 9 | 25.551 | 2.30 | 1.90366 | 31.3 |
| 10 | ∞ | 0.82 | | |
| 11 | 16.661 | 4.50 | 1.60311 | 60.6 |
| 12 | −40.410 | 0.70 | 1.90366 | 31.3 |
| 13 | 14.796 | 3.21 | | |
| 14(diaphragm) | ∞ | 1.82 | | |
| 15 | 23.294 | 0.70 | 1.91082 | 35.3 |
| 16 | 13.732 | 4.00 | 1.60311 | 60.6 |
| 17 | −56.310 | 0.80 | | |
| 18 | 30.833 | 1.90 | 1.60311 | 60.6 |
| 19 | ∞ | (variable) | | |
| 20 | 42.206 | 0.70 | 1.91082 | 35.3 |
| 21 | 16.989 | (variable) | | |
| 22* | −51.498 | 2.00 | 1.53110 | 55.9 |

-continued

UNIT mm

| | | | | |
|---|---|---|---|---|
| 23* | −800.000 | (variable) | | |
| 24 | 144.430 | 3.60 | 1.84666 | 23.9 |
| 25 | −116.569 | (variable) | | |
| 26 | ∞ | 1.50 | 1.51633 | 64.1 |
| 27 | ∞ | (variable) | | |
| image plane | ∞ | | | |

ASPHERIC DATA

22nd surface

K = 0.00000e+000 A4 = −1.57463e−004 A6 = 1.04871e−006
A8 = −1.26019e−009 A10 = −4.88195e−011 A12 = 2.09933e−013

23rd surface

K = 0.00000e+000 A4 = −1.45140e−004 A6 = 1.09597e−006
A8 = −5.39275e−009 A10 = 6.43335e−012 A12 = 1.24146e−014

VARIOUS DATA
Zoom ratio 4.12

| | wide-angle | middle | Telephoto |
|---|---|---|---|
| Focal length | 24.72 | 66.67 | 101.85 |
| F-number | 4.11 | 6.18 | 7.31 |
| Half angle of view (degree) | 38.84 | 17.98 | 11.99 |
| Image height | 19.90 | 21.64 | 21.64 |
| Overall lens length | 107.32 | 129.72 | 156.93 |
| BF | 13.24 | 36.77 | 37.68 |
| d 2 | 1.44 | 19.55 | 32.15 |
| d 8 | 24.94 | 4.11 | 0.70 |
| d19 | 2.50 | 3.87 | 4.03 |
| d21 | 15.04 | 13.66 | 13.50 |
| d23 | 1.16 | 2.75 | 19.87 |
| d25 | 11.12 | 34.65 | 35.56 |
| d27 | 1.12 | 1.12 | 1.12 |

LENS UNIT DATA

| Unit | Starting surface | Focal length |
|---|---|---|
| 1 | 1 | 108.48 |
| 2 | 3 | −21.32 |
| 3 | 9 | 21.87 |
| 4 | 20 | −31.64 |
| 5 | 22 | −103.73 |
| 6 | 24 | 76.67 |
| 7 | 26 | ∞ |

Numerical Example 2

UNIT mm

Surface data

| Surface number | r | d | nd | vd |
|---|---|---|---|---|
| 1 | 56.951 | 6.40 | 1.65160 | 58.5 |
| 2 | 344.918 | (variable) | | |
| 3 | 120.744 | 1.20 | 2.00330 | 28.3 |
| 4 | 16.234 | 7.81 | | |
| 5 | −106.253 | 1.00 | 1.67270 | 32.1 |
| 6 | 33.492 | 0.17 | | |
| 7 | 26.188 | 4.90 | 1.95906 | 17.5 |
| 8 | 182.623 | (variable) | | |
| 9 | 28.669 | 2.30 | 1.96300 | 24.1 |
| 10 | 278.043 | 0.82 | | |
| 11 | 14.524 | 4.50 | 1.58913 | 61.1 |
| 12 | −50.234 | 0.70 | 1.78472 | 25.7 |
| 13 | 12.756 | 3.21 | | |
| 14(diaphragm) | ∞ | 2.26 | | |
| 15 | 20.693 | 0.70 | 1.85150 | 40.8 |
| 16 | 12.200 | 4.00 | 1.57135 | 53.0 |

-continued

UNIT mm

| | | | | |
|---|---|---|---|---|
| 17 | −53.732 | 0.80 | | |
| 18 | 26.971 | 1.90 | 1.59282 | 68.6 |
| 19 | 95.845 | 2.50 | | |
| 20 | 58.488 | 0.70 | 2.00069 | 25.5 |
| 21 | 18.686 | 11.48 | | |
| 22* | −125.824 | 2.00 | 1.51823 | 58.9 |
| 23* | −800.000 | (variable) | | |
| 24 | 68.787 | 3.60 | 1.95906 | 17.5 |
| 25 | 1034.722 | (variable) | | |
| 26 | ∞ | 1.50 | 1.51633 | 64.1 |
| 27 | ∞ | (variable) | | |
| image plane | ∞ | | | |

ASPHERIC DATA

22nd surface

K = 0.00000e+000 A4 = −9.99795e−005 A6 = 1.19077e−006
A8 = −9.43895e−009 A10 = 5.53720e−011 A12 = −1.53779e−013

23rd surface

K = 0.00000e+000 A4 = −9.15748e−005 A6 = 9.17303e−007
A8 = −6.57008e−009 A10 = 3.24525e−011 A12 = −7.51436e−014

VARIOUS DATA
Zoom ratio 4.12

| | wide-angle | middle | Telephoto |
|---|---|---|---|
| Focal length | 24.72 | 65.64 | 101.85 |
| F-number | 4.12 | 6.62 | 7.31 |
| Half angle of view (degree) | 38.84 | 18.24 | 11.99 |
| Image height | 19.90 | 21.64 | 21.64 |
| Overall lens length | 106.11 | 129.14 | 156.93 |
| BF | 15.90 | 41.99 | 36.80 |
| d 2 | 1.14 | 19.70 | 36.48 |
| d 8 | 24.14 | 3.71 | 0.70 |
| d23 | 1.99 | 0.80 | 20.01 |
| d25 | 13.79 | 39.87 | 34.68 |
| d27 | 1.12 | 1.12 | 1.12 |

LENS UNIT DATA

| Unit | Starting surface | Focal length |
|---|---|---|
| 1 | 1 | 103.78 |
| 2 | 3 | −21.84 |
| 3 | 9 | 27.67 |
| 4 | 24 | 76.69 |
| 5 | 26 | ∞ |

Numerical Example 3

UNIT mm

Surface data

| Surface number | r | d | nd | vd |
|---|---|---|---|---|
| 1 | 58.828 | 6.40 | 1.65100 | 56.2 |
| 2 | 446.648 | (variable) | | |
| 3 | 156.813 | 1.20 | 1.95375 | 32.3 |
| 4 | 16.504 | 8.15 | | |
| 5 | −64.951 | 1.00 | 1.70154 | 41.2 |
| 6 | 39.312 | 0.17 | | |
| 7 | 29.790 | 4.90 | 1.96300 | 24.1 |
| 8 | −2376.140 | (variable) | | |
| 9 | 35.315 | 2.30 | 2.00069 | 25.5 |
| 10 | 1240.313 | 0.82 | | |
| 11 | 14.383 | 4.50 | 1.51742 | 52.4 |
| 12 | −52.935 | 0.70 | 1.75520 | 27.5 |
| 13 | 14.465 | 3.16 | | |
| 14(diaphragm) | ∞ | 1.52 | | |

-continued

UNIT mm

| | | | | |
|---|---|---|---|---|
| 15 | 19.259 | 0.70 | 1.91082 | 35.3 |
| 16 | 12.159 | 4.00 | 1.54814 | 45.8 |
| 17 | -54.219 | 0.80 | | |
| 18 | 24.276 | 1.90 | 1.59282 | 68.6 |
| 19 | 177.532 | 2.50 | | |
| 20 | 60.401 | 0.70 | 1.96300 | 24.1 |
| 21 | 17.042 | (variable) | | |
| 22* | -136.713 | 2.00 | 1.51823 | 58.9 |
| 23* | 201.815 | (variable) | | |
| 24 | 76.787 | 3.60 | 1.94595 | 18.0 |
| 25 | -897.776 | (variable) | | |
| 26 | ∞ | 1.50 | 1.51633 | 64.1 |
| 27 | ∞ | (variable) | | |
| image plane | ∞ | | | |

ASPHERIC DATA

22nd surface

K = 0.00000e+000 A4 = -1.60500e-004 A6 = 1.12383e-006
A8 = -3.58608e-009 A10 = -2.10520e-011 A12 = 9.22479e-014

23rd surface

K = 0.00000e+000 A4 = -1.46476e-004 A6 = 1.04435e-006
A8 = -5.00787e-009 A10 = 6.37441e-012 A12 = 2.98275e-015

VARIOUS DATA
Zoom ratio 4.12

| | wide-angle | middle | Telephoto |
|---|---|---|---|
| Focal length | 24.72 | 65.83 | 101.86 |
| F-number | 4.12 | 6.48 | 7.31 |
| Half angle of view (degree) | 38.84 | 18.19 | 11.99 |
| Image height | 19.90 | 21.64 | 21.64 |
| Overall lens length | 107.33 | 129.71 | 156.93 |
| BF | 14.88 | 39.36 | 37.36 |
| d 2 | 1.53 | 19.74 | 34.93 |
| d 8 | 25.23 | 4.26 | 0.70 |
| d21 | 13.88 | 13.44 | 11.57 |
| d23 | 0.80 | 1.88 | 21.34 |
| d25 | 12.76 | 37.24 | 35.25 |
| d27 | 1.12 | 1.12 | 1.12 |

LENS UNIT DATA

| Unit | Starting surface | Focal length |
|---|---|---|
| 1 | 1 | 103.40 |
| 2 | 3 | -22.44 |
| 3 | 9 | 28.26 |
| 4 | 22 | -156.95 |
| 5 | 24 | 74.91 |
| 6 | 26 | ∞ |

TABLE 1

| | | NUMERICAL EXAMPLE 1 | NUMERICAL EXAMPLE 2 | NUMERICAL EXAMPLE 3 |
|---|---|---|---|---|
| | fw | 24.72002 | 24.72002 | 24.72008 |
| | ft | 101.8506 | 101.8506 | 101.8639 |
| | f1 | 108.4797 | 103.7773 | 103.4014 |
| | f2 | -21.3242 | -21.84 | -22.4422 |
| | f3 | 21.86936 | 27.66847 | 28.26444 |
| | f4 | -31.6386 | 76.69106 | -156.954 |
| | f5 | -103.732 | — | 74.91358 |
| | f6 | 76.67404 | — | — |
| | f3A | 49.84542 | 47.11822 | 51.19807 |
| | f3B | 36.87683 | 35.07421 | 36.43222 |
| | f3C | 51.12336 | 62.67009 | 47.21935 |
| | ff | -31.6386 | -27.6824 | -24.8502 |
| | fr | 76.67404 | 76.69106 | 74.91358 |
| Expression | (1) f3/|f2| | 1.025564 | 1.266872 | 1.259434 |
| | (2) f3/fw | 0.884682 | 1.119274 | 1.14338 |
| | (3) f3A/|f2| | 0.975073 | 0.789345 | 0.794008 |
| | (4) f3B/f3C | 0.72133 | 0.559664 | 0.771553 |
| | (5) f3B/|f2| | 1.72934 | 1.605964 | 1.623382 |
| | (6) f1/ft | 1.065086 | 1.018918 | 1.015093 |
| | (7) f1/|f2| | 5.087157 | 4.751714 | 4.607458 |
| | (8) ff/f2 | 1.483695 | 1.267508 | 1.107301 |
| | (9) f1/fr | 1.414816 | 1.353187 | 1.380276 |

This example can realize a compact zoom lens having a high zoom ratio, a good optical performance over the entire zoom range from the wide-angle end to the telephoto end, and an image stabilization function.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-124849, filed on Jul. 3, 2019, which is hereby incorporated by reference herein in its entirety.

What is claimed is:

1. A zoom lens comprising, in order from an object side to an image side:
   a first lens unit having a positive refractive power;
   a second lens unit having a negative refractive power;
   a third lens unit having a positive refractive power; and
   a rear unit that includes a plurality of lens units,
   wherein all lens units move during zooming, and a distance between adjacent lens units changes,
   wherein the third lens unit includes, in order from the object side to the image side, a first subunit having a positive refractive power, a second subunit having a positive refractive power, and a third subunit having a positive refractive power,
   wherein the second subunit includes a negative lens and a positive lens,
   wherein the second subunit moves in a direction having a component orthogonal to an optical axis during an image stabilization, and
   wherein the following inequalities are satisfied:

$0.80 < f3/|f2| < 1.29$;

$0.40 < f3B/f3C < 1.10$; and $0.50 < f3A/|f2| < 1.30$, where f2 is a focal length of the second lens unit, f3 is a focal length of the third lens unit, f3B is a focal length of the second subunit, f3C is a focal length of the third subunit, and f3A is a focal length of the first subunit.

2. The zoom lens according to claim 1, wherein the following inequality is satisfied:

$0.60 < f3/fw < 1.30$, where fw is a focal length of the zoom lens at a wide-angle end.

3. The zoom lens according to claim 1, wherein the following inequality is satisfied:

$1.20 < f3B/|f2| < 2.00$, where f3B is a focal length of the second subunit.

4. The zoom lens according to claim 1, wherein the following inequality is satisfied:

$$4.20 < f1/|f2| < 5.30,$$

where f1 is a focal length of the first lens unit.

5. The zoom lens according to claim 1, wherein:
the third subunit consists of one positive lens,
a focus unit consisting of one negative lens disposed on the image side of the third subunit moves during focusing, and
the following inequality is satisfied:

$$0.90 < ff/f2 < 1.70,$$

where ff is a focal length of the focus unit.

6. The zoom lens according to claim 1, wherein:
a lens unit closest to an image in the zoom lens consists of one positive lens, and
the following inequality is satisfied:

$$1.00 < f1/fr < 1.70,$$

where f1 is a focal length of the first lens unit, and fr is a focal length of the lens unit closest to the image.

7. The zoom lens according to claim 1, wherein the second subunit consists of one negative lens and one positive lens.

8. The zoom lens according to claim 1, wherein the second subunit includes a cemented lens of one negative lens and one positive lens.

9. The zoom lens according to claim 1, wherein a second lens, among all of the lens units having a refractive power in the zoom lens, counted from the image side to the object side in the zoom lens is a negative lens having an aspherical surface.

10. The zoom lens according to claim 1, wherein the third subunit consists of one lens.

11. The zoom lens according to claim 1, further comprising a diaphragm disposed on the image side of the first subunit.

12. A zoom lens comprising, in order from an object side to an image side:
  a first lens unit having a positive refractive power;
  a second lens unit having a negative refractive power;
  a third lens unit having a positive refractive power; and
  a rear unit that includes a plurality of lens units,
  wherein all lens units move during zooming, and a distance between adjacent lens units changes,
  wherein the third lens unit includes, in order from the object side to the image side, a first subunit having a positive refractive power, a second subunit having a positive refractive power, and a third subunit having a positive refractive power,
  wherein the second subunit includes a negative lens and a positive lens,
  wherein the second subunit moves in a direction having a component orthogonal to an optical axis during an image stabilization,
  wherein a lens unit, among the plurality of lens units of the rear unit, closest to an image side has a positive refractive power, and
  wherein the following inequalities are satisfied:

$$0.80 < f3/|f2| < 1.29; \text{ and}$$

$$0.80 < f1/ft < 1.30,$$

where f1 is a focal length of the first lens unit, ft is a focal length of the zoom lens at the telephoto end, f2 is a focal length of the second lens unit, and f3 is a focal length of the third lens unit.

13. An image pickup apparatus comprising:
a zoom lens; and
an image sensor configured to receive image light formed by the zoom lens,
wherein the zoom lens comprises, in order from an object side to an image side:
  a first lens unit having a positive refractive power;
  a second lens unit having a negative refractive power;
  a third lens unit having a positive refractive power; and
  a rear unit that includes a plurality of lens units,
  wherein all lens units move during zooming, and a distance between adjacent lens units changes,
  wherein the third lens unit includes, in order from the object side to the image side, a first subunit having a positive refractive power, a second subunit having a positive refractive power, and a third subunit having a positive refractive power,
  wherein the second subunit includes a negative lens and a positive lens,
  wherein the second subunit moves in a direction having a component orthogonal to an optical axis during an image stabilization, and
  wherein the following inequalities are satisfied:

$$0.80 < f3/|f2| < 1.29;$$

$$0.40 < f3B/f3C < 1.10; \text{ and}$$

$$0.50 < f3A/|f2| < 1.30,$$

where f2 is a focal length of the second lens unit, f3 is a focal length of the third lens unit, f3B is a focal length of the second subunit, f3C is a focal length of the third subunit, and f3A is a focal length of the first subunit.

* * * * *